US011016213B2

(12) United States Patent
Goujon

(10) Patent No.: US 11,016,213 B2
(45) Date of Patent: May 25, 2021

(54) GRADIENT-BASED 4D SEABED ACQUISITION POSITIONING

(71) Applicant: WESTERNGECO LLC, Houston, TX (US)

(72) Inventor: Nicolas Goujon, Oslo (NO)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 378 days.

(21) Appl. No.: 15/777,668

(22) PCT Filed: Nov. 20, 2016

(86) PCT No.: PCT/US2016/062974
§ 371 (c)(1),
(2) Date: May 20, 2018

(87) PCT Pub. No.: WO2017/091480
PCT Pub. Date: Jun. 1, 2017

(65) Prior Publication Data
US 2018/0335537 A1  Nov. 22, 2018

Related U.S. Application Data

(60) Provisional application No. 62/258,680, filed on Nov. 23, 2015, provisional application No. 62/270,397, filed on Dec. 21, 2015.

(51) Int. Cl.
G01V 1/38 (2006.01)
G01V 1/36 (2006.01)

(52) U.S. Cl.
CPC .............. G01V 1/3835 (2013.01); G01V 1/36 (2013.01); G01V 1/3852 (2013.01);
(Continued)

(58) Field of Classification Search
CPC .............. G01V 1/3835; G01V 1/3852; G01V 2210/1297; G01V 2210/612; G01V 2210/1427
See application file for complete search history.

(56) References Cited

U.S. PATENT DOCUMENTS 7,523,003 B2 * 4/2009 Robertsson .............. G01V 1/36
702/14
2008/0144442 A1 * 6/2008 Combee .................. G01V 1/38
367/131
(Continued)

FOREIGN PATENT DOCUMENTS

WO  2015/140644 A2  9/2015

OTHER PUBLICATIONS

Anderson, Brian & Berg, Eivind & Gunn, Phil & Ronen, Shuki & Exploration, Seabird. (2009). Autonomous Nodes for Time Lapse Reservoir Seismic: An Alternative to Permanent Seabed Arrays. 10.1190/1.3603531. (Year: 2009).*

(Continued)

Primary Examiner — Ian J Lobo
(74) Attorney, Agent, or Firm — Michael Guthrie

(57) ABSTRACT

A method includes receiving desired locations of nodes for deployment on a seabed of a seismic survey where each of the nodes includes a sealed housing and, within the sealed housing, at least one battery and spaced seismic sensors electrically powered by the at least one battery; determining locations of the nodes as deployed on the seabed where at least some of the determined locations differ from their corresponding desired locations; acquiring seismic data sensed by the spaced seismic sensors of the nodes where the acquired seismic data corresponds to the determined locations; and, based at least in part on the acquired seismic data, (Continued)

a spacing of the spaced seismic sensors and the desired locations, generating seismic data for the desired locations.

20 Claims, 13 Drawing Sheets

(52) U.S. Cl.
CPC ............... *G01V 2210/1297* (2013.01); *G01V 2210/1427* (2013.01); *G01V 2210/57* (2013.01); *G01V 2210/612* (2013.01)

(56) References Cited

U.S. PATENT DOCUMENTS

| | | | |
|---|---|---|---|
| 2011/0051550 A1 | 3/2011 | Lindberg | |
| 2011/0228635 A1* | 9/2011 | Tenghamn | G01V 1/3852 367/16 |
| 2013/0083622 A1* | 4/2013 | Herrmann | G01V 1/3852 367/15 |
| 2013/0163374 A1* | 6/2013 | Herrmann | G01V 1/189 367/20 |
| 2014/0078861 A1 | 3/2014 | Tamanaja | |
| 2014/0198607 A1* | 7/2014 | Etienne | G01V 1/247 367/15 |
| 2014/0211589 A1* | 7/2014 | Maxwell | G01V 1/38 367/15 |
| 2014/0288837 A1 | 9/2014 | Edme et al. | |
| 2014/0336939 A1 | 11/2014 | Brune | |
| 2015/0168576 A1* | 6/2015 | Craft | G01V 1/38 702/14 |
| 2015/0276955 A1 | 10/2015 | Brune | |
| 2015/0323693 A1 | 11/2015 | Rigsby et al. | |

OTHER PUBLICATIONS

Smit, et al., "Repeatability Monitoring during Marine 4D Streamer Acquisition," expanded abstract, 67th EAGE Conference & Exhibition, Jun. 13, 2005.

International Search Report and Written Opinion for the equivalent International patent application PCT/US2016/062974 dated Mar. 10, 2017.

Extended Search Report issued in the corresponding EP Application 16869117.8, dated Sep. 23, 2019 (9 pages).

Eggenberger et al., "Evaluating the Benefit of Pressure-plus-gradient Reconstruction of Time-lapse Seismic Wavefields", Proceedings of the 73th EAGE Conference, May 23, 2011, pp. 23-26.

International Preliminary Report on Patentability for the equivalent International patent application PCT/US2016/062974 dated Jun. 7, 2018.

* cited by examiner

GRADIENT-BASED 4D SEABED ACQUISITION POSITIONING

RELATED APPLICATIONS

This application claims priority to and the benefit of a U.S. Provisional Application having Ser. No. 62/258,680, filed on Nov. 23, 2015, and U.S. Provisional Application having Ser. No. 62/270,397, filed 21 Dec. 2015, which are both incorporated by reference herein.

BACKGROUND

Reflection seismology finds use in geophysics to estimate properties of subsurface formations. Reflection seismology may provide seismic data representing waves of elastic energy as transmitted by P-waves and S-waves, in a frequency range of approximately 1 Hz to approximately 100 Hz. Seismic data may be processed and interpreted to understand better composition, fluid content, extent and geometry of subsurface rocks.

SUMMARY

A method includes receiving desired locations of nodes for deployment on a seabed of a seismic survey where each of the nodes includes a sealed housing and, within the sealed housing, at least one battery and spaced seismic sensors electrically powered by the at least one battery; determining locations of the nodes as deployed on the seabed where at least some of the determined locations differ from their corresponding desired locations; acquiring seismic data sensed by the spaced seismic sensors of the nodes where the acquired seismic data corresponds to the determined locations; and, based at least in part on the acquired seismic data, a spacing of the spaced seismic sensors and the desired locations, generating seismic data for the desired locations. A system includes a processor; memory operatively coupled to the processor; and processor-executable instructions stored in the memory to instruct the system to: receive desired locations of nodes for deployment on a seabed of a seismic survey where each of the nodes includes a sealed housing and, within the sealed housing, at least one battery and spaced seismic sensors electrically powered by the at least one battery; determine locations of the nodes as deployed on the seabed where at least some of the determined locations differ from their corresponding desired locations; acquire seismic data sensed by the spaced seismic sensors of the nodes where the acquired seismic data corresponds to the determined locations; and, based at least in part on the acquired seismic data, a spacing of the spaced seismic sensors and the desired locations, generate seismic data for the desired locations. A seismic survey node includes a sealed housing; at least one rechargeable battery disposed within the sealed housing; spaced seismic sensors operatively coupled to the at least one rechargeable battery and disposed within the sealed housing wherein the spaced seismic sensors comprise a spacing therebetween of at least 10 centimeters; and a recorder operatively coupled to the spaced seismic sensors wherein the recorder stores sensed seismic data.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

As mentioned, reflection seismology finds use in geophysics to estimate properties of subsurface formations. Reflection seismology can provide seismic data representing waves of elastic energy, as transmitted by P-waves and S-waves, in a frequency range of approximately 1 Hz to approximately 100 Hz or optionally less than 1 Hz and/or optionally more than 100 Hz. Seismic data may be processed and interpreted to understand better composition, fluid content, extent and geometry of subsurface rocks.

Figure 1:
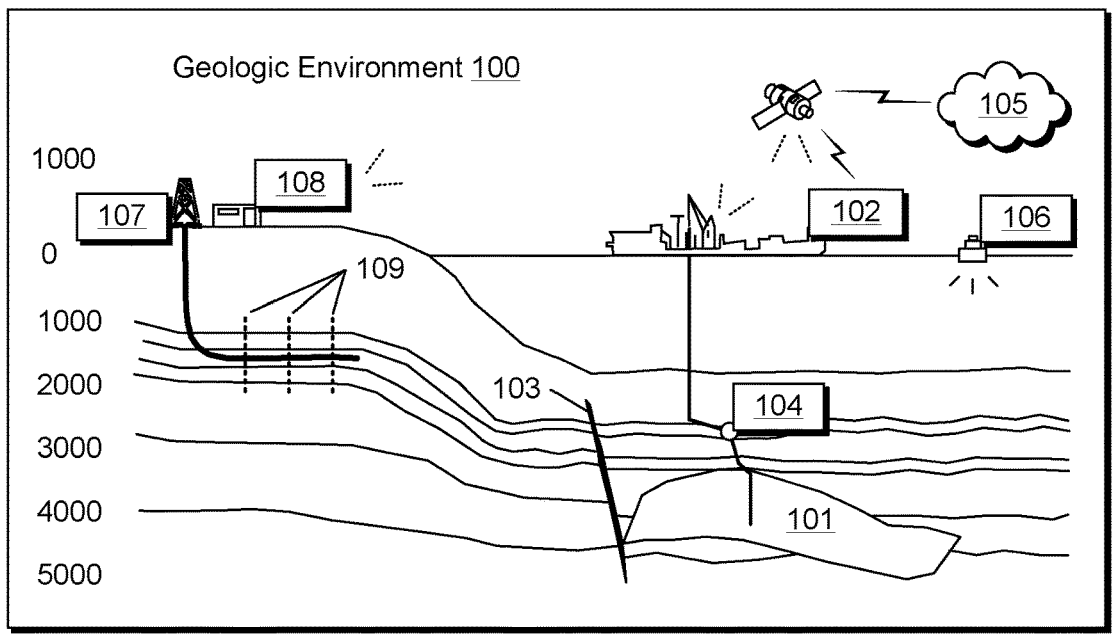
FIG. 1 illustrates a geologic environment and a technique.
Figure 1:
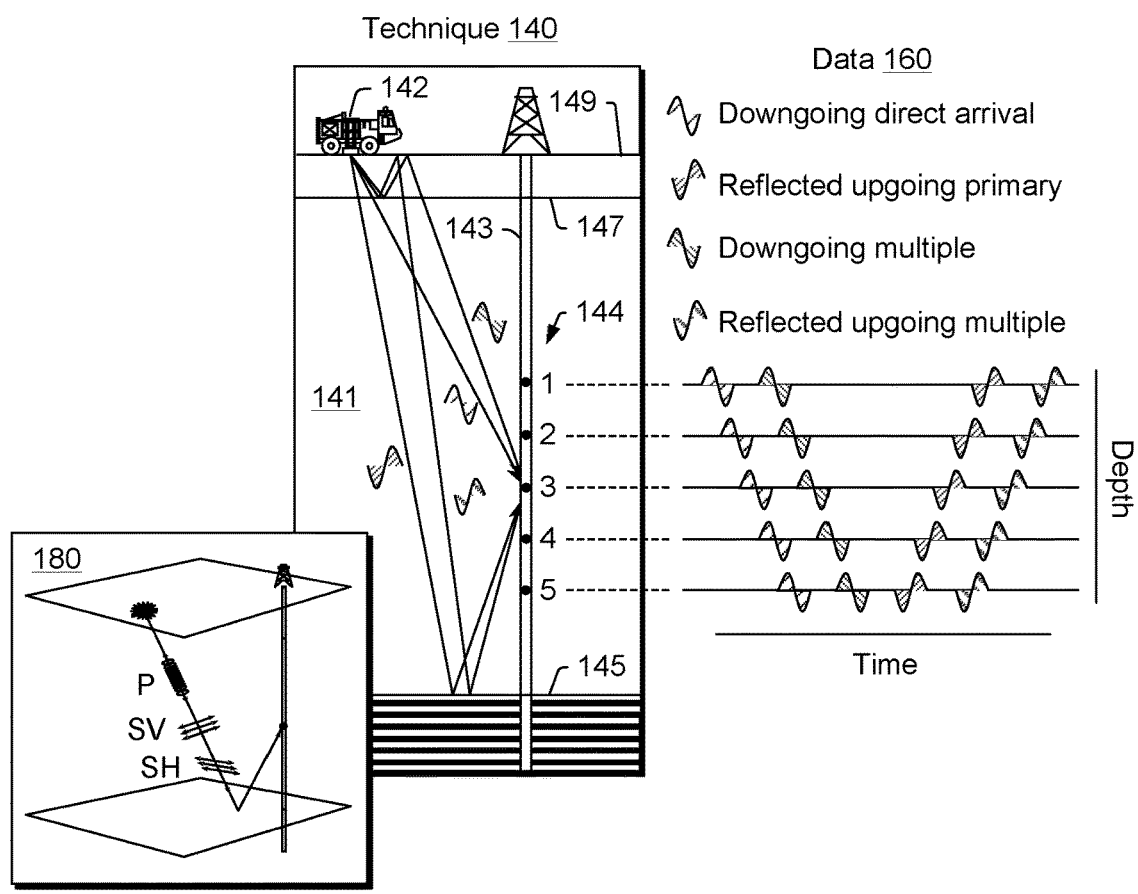

FIG. 1 shows a geologic environment 100 (an environment that includes a sedimentary basin, a reservoir 101, a fault 103, one or more fractures 109, etc.) and an acquisition technique 140 to acquire seismic data (see data 160). A system may process data acquired by the technique 140 to allow for direct or indirect management of sensing, drilling, injecting, extracting, etc., with respect to the geologic environment 100. In turn, further information about the geologic environment 100 may become available as feedback (optionally as input to the system). An operation may pertain to a reservoir that exists in the geologic environment 100 such as the reservoir 101. A technique may provide information (as an output) that specifies one or more location coordinates of a feature in a geologic environment, one or more characteristics of a feature in a geologic environment, etc.

The geologic environment 100 may be referred to as a formation or may be described as including one or more formations. A formation may be a unit of lithostratigraphy such as a body of rock that is sufficiently distinctive and continuous.

A system may be implemented to process seismic data, optionally in combination with other data. Processing of data may include generating one or more seismic attributes, rendering information to a display or displays, etc. A process or workflow may include interpretation, which may be performed by an operator that examines renderings of information (to one or more displays, etc.) and that identifies structure or other features within such renderings. Interpretation may be or include analyses of data with a goal to generate one or more models and/or predictions (about properties and/or structures of a subsurface region).

A system may include features of a commercially available framework such as the PETREL® seismic to simulation software framework (Schlumberger Limited, Houston, Tex.). Such a framework can receive seismic data and other data and allow for interpreting data to determine structures that can be utilized in building a simulation model.

A system may include add-ons or plug-ins that operate according to specifications of a framework environment. A commercially available framework environment marketed as the OCEAN® framework environment (Schlumberger Limited, Houston, Tex.) allows for integration of add-ons (or plug-ins) into a PETREL® framework workflow. The OCEAN® framework environment leverages .NET® tools (Microsoft Corporation, Redmond, Wash.) and offers stable, user-friendly interfaces for efficient development.

Seismic data may be processed using a framework such as the OMEGA® framework (Schlumberger Limited, Houston, Tex.). The OMEGA® framework provides features that can be implemented for processing of seismic data through prestack seismic interpretation and seismic inversion.

A framework for processing data may include features for 2D line and 3D seismic surveys. Modules for processing seismic data may include features for prestack seismic interpretation (PSI), optionally pluggable into a framework such as the OCEAN® framework.

In FIG. 1, the geologic environment 100 includes an offshore portion and an onshore portion. A geologic environment may be or include one or more of an offshore geologic environment, a seabed geologic environment, an ocean bed geologic environment, etc.

The geologic environment 100 may be outfitted with one or more of a variety of sensors, detectors, actuators, etc. Equipment 102 may include communication circuitry that receives and that transmits information with respect to one or more networks 105. Such information may include information associated with downhole equipment 104, which may be equipment to acquire information, to assist with resource recovery, etc. Other equipment 106 may be located remote from a well site and include sensing, detecting, emitting or other circuitry and/or be located on a seabed. Such equipment may include storage and communication circuitry that stores and that communicates data, instructions, etc. One or more satellites may be provided for purposes of communications, data acquisition, etc. FIG. 1 shows a satellite in communication with the network 105 that may be configured for communications, noting that the satellite may additionally or alternatively include circuitry for imagery (spatial, spectral, temporal, radiometric, etc.).

FIG. 1 also shows the geologic environment 100 as optionally including equipment 107 and 108 associated with a well that includes a substantially horizontal portion that may intersect with one or more of the one or more fractures 109; consider a well in a shale formation that may include natural fractures, artificial fractures (hydraulic fractures) or a combination of natural and artificial fractures. The equipment 107 and/or 108 may include components, a system, systems, etc. for fracturing, seismic sensing, analysis of seismic data, assessment of one or more fractures, etc.

A system may be used to perform one or more workflows. A workflow may be a process that includes a number of worksteps. A workstep may operate on data to create new data, to update existing data, etc. A system may operate on one or more inputs and create one or more results based on one or more algorithms. A workflow may be a workflow implementable in the PETREL® software that operates on seismic data, seismic attribute(s), etc. A workflow may be a process implementable in the OCEAN® framework. A workflow may include one or more worksteps that access a plug-in (external executable code, etc.). A workflow may include rendering information to a display (a display device). A workflow may include receiving instructions to interact with rendered information to process information and optionally render processed information. A workflow may include transmitting information that may control, adjust, initiate, etc. one or more operations of equipment associated with a geologic environment (in the environment, above the environment, etc.).

In FIG. 1, the technique 140 may be implemented with respect to a geologic environment 141. As shown, an energy source (a transmitter) 142 may emit energy where the energy travels as waves that interact with the geologic environment 141. The geologic environment 141 may include a bore 143 where one or more sensors (receivers) 144 may be positioned in the bore 143. Energy emitted by the energy source 142 may interact with a layer (a structure, an interface, etc.) 145 in the geologic environment 141 such that a portion of the energy is reflected, which may then be sensed by one or more of the sensors 144. Such energy may be reflected as an upgoing primary wave (or "primary" or "singly" reflected wave). A portion of emitted energy may be reflected by more than one structure in the geologic environment and referred to as a multiple reflected wave (or "multiple"). The geologic environment 141 is shown as including a layer 147 that resides below a surface layer 149. Given such an environment and arrangement of the source 142 and the one or more sensors 144, energy may be sensed as being associated with particular types of waves.

A "multiple" may refer to multiply reflected seismic energy or an event in seismic data that has incurred more than one reflection in its travel path. Seismic data may include evidence of an interbed multiple from bed interfaces, evidence of a multiple from a water interface (an interface of a base of water and rock or sediment beneath it) or evidence of a multiple from an air-water interface, etc.

As shown in FIG. 1, the acquired data 160 can include data associated with downgoing direct arrival waves, reflected upgoing primary waves, downgoing multiple reflected waves and reflected upgoing multiple reflected waves. The acquired data 160 is also shown along a time axis and a depth axis. As indicated, in a manner dependent at least in part on characteristics of media in the geologic environment 141, waves travel at velocities over distances such that relationships may exist between time and space. Thus, time information, as associated with sensed energy, may allow for understanding spatial relations of layers, interfaces, structures, etc. in a geologic environment.

FIG. 1 also shows various types of waves as including P, SV an SH waves. A P-wave can be an elastic body wave or sound wave in which particles oscillate in the direction the wave propagates. P-waves incident on an interface (at other than normal incidence, etc.) may produce reflected and transmitted S-waves ("converted" waves). An S-wave or shear wave may be an elastic body wave in which particles oscillate perpendicular to the direction in which the wave propagates. S-waves may be generated by a seismic energy sources (other than an air gun). S-waves may be converted to P-waves. S-waves tend to travel more slowly than P-waves and do not travel through fluids that do not support shear. Recording of S-waves involves use of one or more receivers operatively coupled to earth (capable of receiving shear forces with respect to time). Interpretation of S-waves may allow for determination of rock properties such as fracture density and orientation, Poisson's ratio and rock type by crossplotting P-wave and S-wave velocities, and/or by other techniques. Parameters that may characterize anisotropy of media (seismic anisotropy) include the Thomsen parameters ε, δ and γ.

Seismic data may be acquired for a region in the form of traces. In FIG. 1, the technique 140 may include the source 142 for emitting energy where portions of such energy (directly and/or reflected) may be received via the one or more sensors 144. Energy received may be discretized by an analog-to-digital converter that operates at a sampling rate. Acquisition equipment may convert energy signals sensed by a sensor to digital samples at a rate of one sample per approximately 4 ms. Given a speed of sound in a medium or media, a sample rate may be converted to an approximate distance. The speed of sound in rock may be of the order of around 5 km per second. Thus, a sample time spacing of approximately 4 ms would correspond to a sample "depth" spacing of about 10 meters (assuming a path length from source to boundary and boundary to sensor). A trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing scenario is divided by two (to account for reflection), for a vertically aligned source and sensor, the deepest boundary depth may be estimated to be about 10 km (assuming a speed of sound of about 5 km per second).

Figure 2:
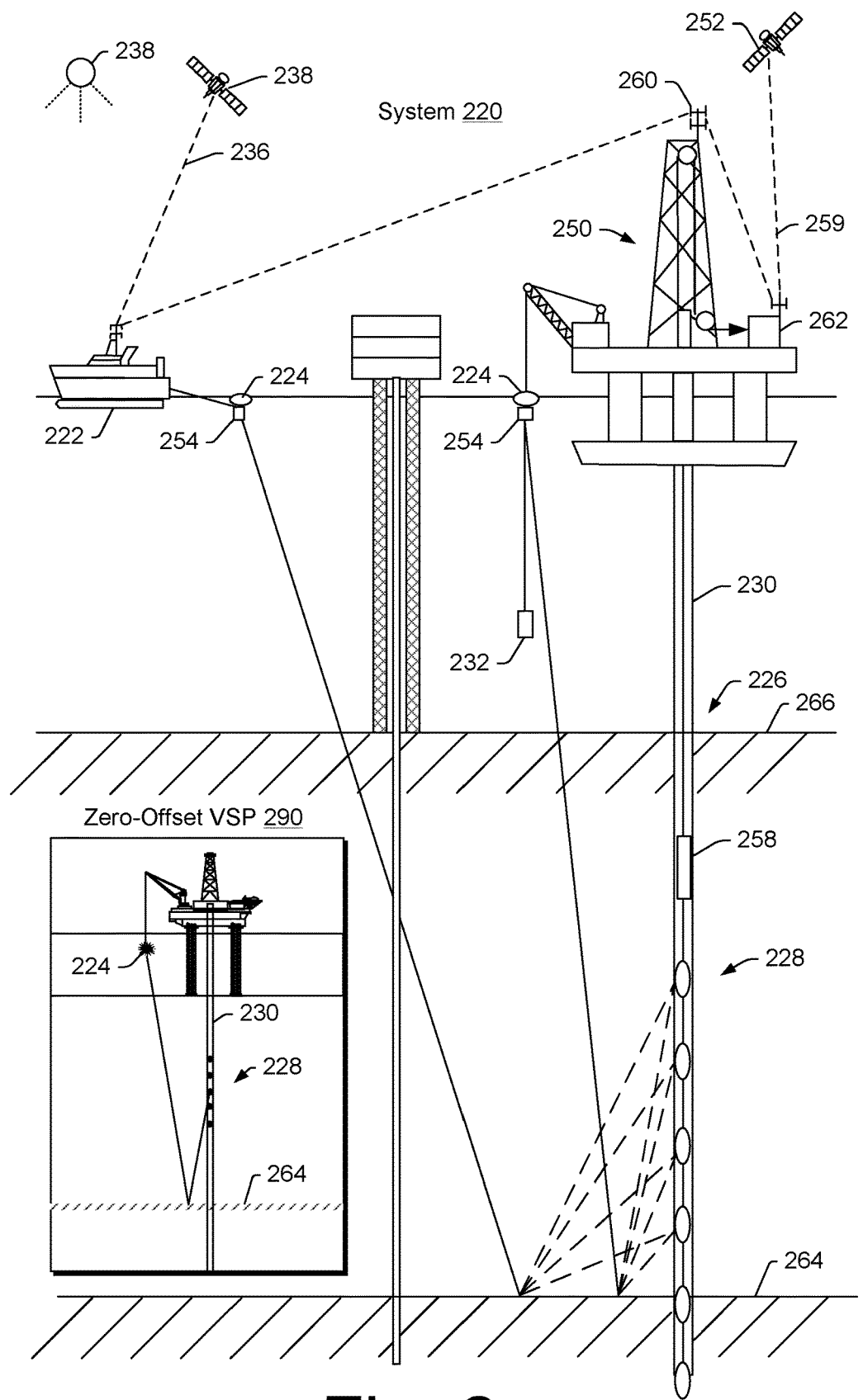
FIG. 2 illustrates a system.

FIG. 2 shows a system 220 in which one or more vessels 222 may be employed to enable seismic profiling such as three-dimensional vertical seismic profiling (VSP), rig/offset vertical seismic profiling (VSP), etc. In FIG. 2, the system 220 is illustrated as including a rig 250, the vessel 222, and one or more acoustic receivers 228 (a receiver array). The vessel 222 may include a source 224 (or source array) and/or the rig 250 may include a source 224 (or source array).

The vessel 222 may travel a path or paths where locations may be recorded through the use of navigation system signals 236. Such signals may be associated with a satellite-based system that includes one or more satellites 238 and 252. The satellite 238 may be part of a global positioning system (GPS), which may be implemented to record position, speed, direction, and other parameters of the vessel 222. One or more satellites, communication equipment, etc. may be configured to provide for VSAT communications, VHF communications, UHF communications, etc.

In FIG. 2, the acoustic receivers 228 may be part of a data acquisition system 226 that may be deployed in borehole 230 via one or more of a variety of delivery systems, such as wireline delivery systems, slickline delivery systems, or one or more other types suitable delivery systems. The acoustic receivers 228 may be communicatively coupled with processing equipment 258, which may be positioned at a downhole location. Processing equipment 258 may include a telemetry system for transmitting data from acoustic receivers 228 to additional processing equipment 262 located at the surface, on the rig 250 and/or vessels 222. Information acquired may optionally be transmitted (see signals 259).

Depending on the specifics of a given data communication system, surface processing equipment 262 may include a radio repeater 260 and/or one or more of a variety of other and/or additional signal transfer components and signal processing components. The acoustic receivers 228 may be coupled to the surface processing equipment 262 via one or more wire connections; noting that additionally or alternatively wireless and/or optical connections may be employed.

The surface processing equipment 262 may include a synchronization unit to assist with coordination of emissions from one or more sources (optionally dithered (delayed) source arrays). Coordination may extend to one or more receivers (consider the acoustic receivers 228 located in borehole 230). A synchronization unit may use coordinated universal time, optionally employed in cooperation with a global positioning system (to obtain UTC data from GPS receivers of a GPS system).

FIG. 2 illustrates equipment for performing seismic profiling. The seismic profiling may include three-dimensional vertical seismic profiling (VSP) but other applications may utilize rig/offset vertical seismic profiling or seismic profiling employing walkaway lines. An offset source may be provided by the source 224 located on the rig 250, on the vessel 222, and/or on another vessel or structure (stationary and/or movable from one location to another location).

A system may employ one or more of various arrangements of a source or sources on a vessel(s) and/or a rig(s). As shown in FIG. 2, the acoustic receivers 228 of downhole acquisition system 226 are configured to receive the source signals, at least some of which are reflected off a reflection boundary 264 located beneath a sea bottom 236. The acoustic receivers 228 may generate data streams that are relayed uphole to a suitable processing system such as the processing system 262.

While the acoustic receivers 228 may generate data streams, a navigation system may determine a real-time speed, position, and direction of the vessel 222 and also estimate initial shot times accomplished via signal generators 254 of the appropriate source 224 (or source array). A source controller may be part of the surface processing equipment 262 (located on the rig 250, on the vessel 222, or at other suitable location) and may be configured with circuitry that can control firing of acoustic source generated signals so that the timing of an additional shot time (optionally a shot time via a slave vessel) may be based on an initial shot time (a shot time via a master vessel) plus a dither value.

A synchronization unit of the surface processing equipment 262, may coordinate firing of dithered acoustic signals with recording of acoustic signals by the downhole acquisition system 226. A processor system may be configured to separate a data stream of the initial shot and a data stream of the additional shot via a coherency filter. An approach may employ simultaneous acquisition and/or may not perform separation of the data streams. In such cases, the dither may be effectively zero.

After an initial shot time at T=0 (T0) is determined, subsequent firings of acoustic source arrays may be offset by a dither. The dithers may be positive or negative and sometimes created as pre-defined random delays. Use of dithers facilitates the separation of simultaneous or near-simultaneous data sets to simplify the data processing. The ability to have acoustic source arrays fire in simultaneous or near-simultaneous patterns reduces the overall amount of time used for three-dimensional vertical seismic profiling source acquisition. This, in turn, may help to reduce overall cost of a seismic operation.

Also shown in FIG. 2 is an inset of a zero-offset vertical seismic profile (VSP) scenario 290. In such a scenario, an acquisition geometry may be limited to an ability to position equipment that is physically coupled to the rig 250. As shown, for given the acquisition geometry, there may be no substantial offset between the source 224 and bore 230. In such a scenario, a zero-offset VSP may be acquired where seismic waves travel substantially vertically down to a reflector (see the layer 264) and up to the receiver 228, which may be a receiver array. Where one or more vessels are employed (see the vessel 222), one or more other types of surveys may be performed. A three-dimensional VSP may be performed using a vessel.

Figure 3:
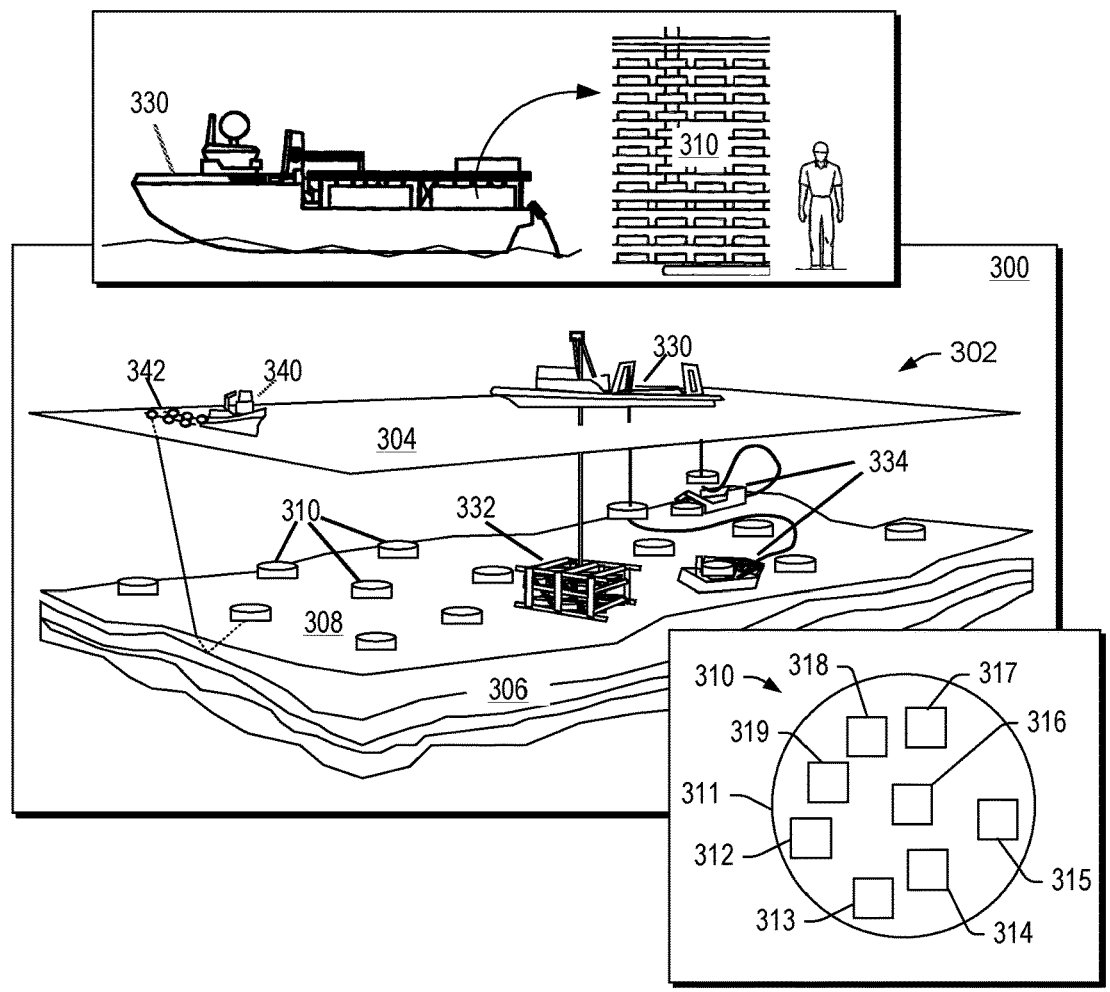
FIG. 3 illustrates a survey system, a node, a method and a computing system.
Figure 3:
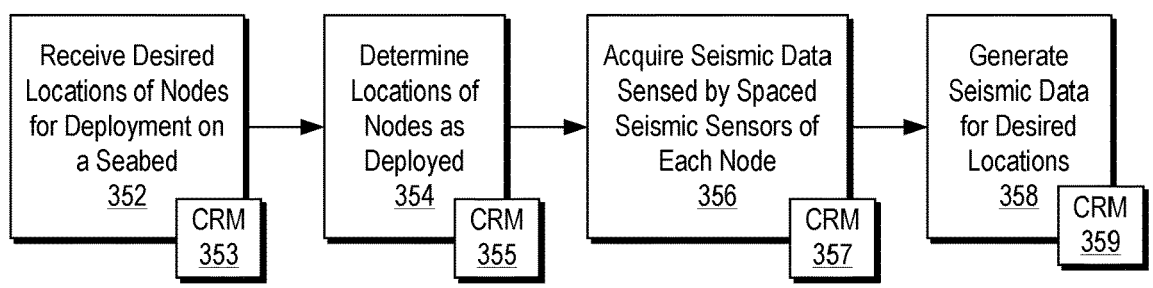
Figure 3:
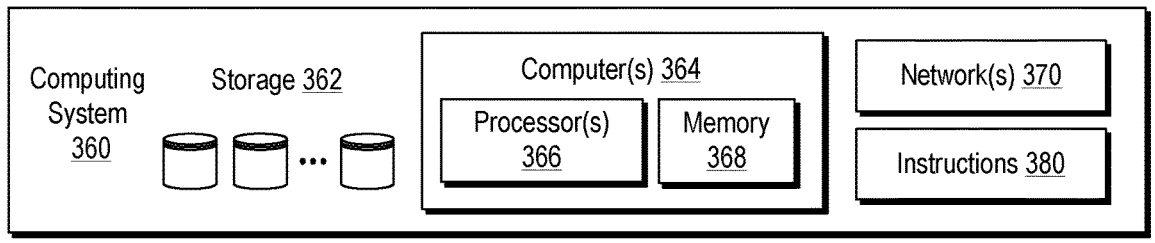

FIG. 3 shows a survey system 300 for acquisition of information in a geologic environment 302 that includes an air-water surface 304, a formation 306 and a seabed 308 where nodes 310 are positioned on the seabed 304. Equipment may be utilized to position the nodes 310 on the seabed 304 and retrieve the nodes 310 from the seabed 304. Such equipment may include one or more vessels 330, one or more carriers 332 and one or more vehicles 334, which may be autonomous, semi-autonomous, etc. (remotely operated vehicles (ROVs), etc.). The survey system 300 may include a seismic source vessel 340 that includes one or more seismic sources 342. The seismic source vessel 340 may travel a path while, at times, emitting seismic energy from the one or more sources 342. In such an approach, the nodes 310 can receive portions of the seismic energy, which can include portions that have traveled through the formation 306. Analysis of received seismic energy by the nodes 310 may reveal features of the formation 306.

In FIG. 3, the vessel 330 is shown as including nodes 310 as cargo arranged on racks. The nodes 310 can be deployed to form an array. An array of nodes may be cabled or un-cabled. A cable may be relatively light weight and utilized to deploy a node receiver line with nodes coupled to the cable at spaced intervals. A rack can be utilized to securely store nodes in slots along multiple rows and columns. An individual slot may include a communications portal that can establish communication via contact(s) and/or contactless/wireless with an individual node seated in the individual slot for download of information, etc. A rack can include charger circuitry that can charge one or more batteries of an individual node seated in an individual slot. A node can be sealed such that components (circuitry, one or more batteries, etc.) are not exposed to water when the node is deployed on an underwater bed. A seal may be a hermetic seal that aims to prevent passage of air and/or water. A seal or seals can aim to prevent intrusion of water from an exterior region to an interior region of a node. Such a node can be considered to be water-tight. A sealed node can be a self-contained piece of equipment that can sense information independent of other equipment when positioned on an underwater surface that may be a seabed.

A rack may be dimensioned in accordance with shipping container dimensions such as about 3 meters by about 7 meters by about 3 meters. As shown in FIG. 3, with reference to a silhouette of a person that is about 1.8 meters in height, a node may be about a meter or less in diameter and about half a meter in height or less.

In FIG. 3, the one or more sources 342 may be an air gun or air gun array (a source array). A source can produce a pressure signal that propagates through water into a formation where acoustic and elastic waves are formed through interaction with features (structures, fluids, etc.) in the formation. Acoustic waves can be characterized by pressure changes and a particle displacement in a direction of which the acoustic wave travels. Elastic waves can be characterized by a change in local stress in material and a particle displacement. Acoustic and elastic waves may be referred to as pressure and shear waves, respectively; noting that shear waves may not propagate in water. Collectively, acoustic and elastic waves may be referred to as a seismic wavefield.

Material in a formation may be characterized by one or more physical parameters such as density, compressibility, and porosity. In the geologic environment 302 of FIG. 3, energy emitted from the one or more sources 342 can be transmitted to the formation 306; however, elastic waves that reach the seabed 308 will not propagate back into the water. Such elastic waves may be received by sensors of the nodes 310. The nodes 310 can include motion sensors that can measure one or more of displacement, velocity and acceleration. A motion sensor may be a geophone, an accelerometer, etc. As to pressure waves, the nodes 310 can include pressure wave sensors such as hydrophones.

In FIG. 3, the nodes 310 can include sensors for acquiring seismic wavefield information at the seabed 308. Each of the nodes 310 can include one or more hydrophones and/or one or more motion sensors (one or more geophones, one or more accelerometers, etc.). Each of the nodes 310 can include a sealed housing and, within the sealed housing, at least one battery and spaced seismic sensors electrically powered by the at least one battery. The spaced seismic sensors can be spaced by a distance that is less than a dimension of the sealed housing. Such a distance may optionally be greater than about 50 percent of the dimension of the sealed housing. Such a distance can be utilized to determine a local gradient for a node where the local gradient can be utilized to generate seismic data at a location that differs from the location of the node as deployed on a seabed. Such a location can be a desired location that can correspond to a prior seismic survey.

A node can include various types of circuitry. Such circuitry can include circuitry that can digitize (analog to digital conversion ADC circuitry) and can include circuitry that can record signals (a microcontroller, a processor, etc., operatively coupled to memory). Each of the nodes 310 can include a housing 311, sensors 312 and 313, one or more microcontrollers or processors 314, one or more batteries 315, memory 316, ADC circuitry 317, a compass 318, communication circuitry 319, etc. Various components of a node may be operatively coupled via wires, connectors, etc. A node can include one or more circuit boards (printed circuit boards, etc.) that can provide for electrical connections between various components, etc.

After deployment, one or more acoustic techniques may be utilized to determine node locations. A technique may employ acoustic pinging where acoustic pingers emit relatively high-frequency pings that are substantially above the maximum frequency of interest for seismic applications. Such relatively high-frequency acoustic signals can be picked up by one or more seismic sensors. Triangulation or one or more other techniques may be utilized to determine node locations for nodes deployed on an underwater surface such as a seabed.

Nodes may be utilized to acquire information spatially and temporally such as in a time-lapse seismic survey, which may be a four-dimensional seismic survey (4D seismic survey). A seismic image of a formation may be made for a first survey and a seismic image of the formation may be made for a second survey where the first and second surveys are separated by time (lapse in time). In such an approach, a comparison of the images can infer changes in formation properties that may be tied to production of hydrocarbons, injection of water or gas, etc.

A first survey may be referred to as a baseline survey, while a subsequent survey may be referred to as a monitor survey. To minimize artifacts in differences between seismic images from successive lapses, a monitor survey may aim to replicate a configuration of a corresponding baseline survey. Where nodes are utilized at various positions on a seabed for a baseline survey, a monitor survey may aim to place nodes on the seabed in a manner that replicates the various positions of the nodes of the baseline survey. For the monitor survey, the nodes may be the same nodes, include some of the same nodes, include some different nodes or may be different nodes. A service may have a stock of nodes that can be utilized for various surveys where once a survey is complete, the nodes are retrieved, transported and positioned for another survey. Such a service may update, replace, etc., nodes from time to time.

A position to within a few meters of accuracy of one or more nodes may be determined via one or more of GPS, an acoustic positioning system (a short-baseline (SBL) or ultra-short baseline (USBL) acoustic system), and one or more other types of systems.

A node can include sensor circuitry for acquiring measurements of a seismic pressure wavefield and its gradient; consider sensor circuitry that can measure a seismic pressure wavefield and its gradient in vertical and crossline directions.

A node can include point-receiver circuitry. A point-receiver approach can combine hydrophones with tri-axial microelectromechanical system (MEMS) accelerometers. In such an approach, the MEMS accelerometers can measure a substantial bandwidth of particle acceleration due to seismic wavefields. Measurements of particle acceleration can be directly related to a gradient in a pressure wavefield. A node may include the ISOMETRIX™ technology, which includes point-receiver circuitry (Schlumberger Limited, Houston, Tex.).

FIG. 3 also shows a method 350 that includes a reception block 352 for receiving desired locations of nodes for deployment on a seabed of a seismic survey where each of the nodes includes a sealed housing and, within the sealed housing, at least one battery and spaced seismic sensors electrically powered by the at least one battery; a determination block 354 for determining locations of the nodes as deployed on the seabed where at least some of the determined locations differ from their corresponding desired locations; an acquisition block 356 for acquiring seismic data sensed by the spaced seismic sensors of the nodes where the acquired seismic data corresponds to the determined locations; and a generation block 358 for, based at least in part on the acquired seismic data, a spacing of the spaced seismic sensors and the desired locations, generating seismic data for the desired locations.

The method 350 is shown in FIG. 3 in association with various computer-readable media (CRM) blocks 353, 355, 357 and 359. Such blocks generally include instructions suitable for execution by one or more processors (or cores) to instruct a computing device or system to perform one or more actions. While various blocks are shown, a single medium may be configured with instructions to allow for, at least in part, performance of various actions of the method 350. A computer-readable medium (CRM) may be a computer-readable storage medium that is not a carrier wave, that is not a signal and that is non-transitory.

FIG. 3 also shows a computing system 360, which can include one or more information storage devices 362, one or more computers 364, one or more network interfaces 370 and instructions 380. As to the one or more computers 364, each computer may include one or more processors (or processing cores) 366 and memory 368 for storing instructions executable by at least one of the one or more processors. A computer may include one or more network interfaces (wired or wireless), one or more graphics cards, a display interface (wired or wireless), etc. A system may include one or more display devices (optionally as part of a computing device, etc.). Memory can be a computer-readable storage medium. A computer-readable storage medium is not a carrier wave, is not a signal and is non-transitory.

A geophone can be a sensor configured for seismic acquisition, whether onshore and/or offshore, that can detect velocity produced by seismic waves and that can transform motion into electrical impulses. A geophone may be configured to detect motion in a single direction. A geophone may be configured to detect motion in a vertical direction. Three mutually orthogonal geophones may be used in combination to collect so-called three-component (3C) seismic data. A hydrophone may be a sensor configured for use in detecting seismic energy in the form of pressure changes under water during marine seismic acquisition. A node may include at least one geophone that can provide for motion detection and at least one hydrophone that can provide for pressure detection. Data (analog and/or digital) may be transmitted from a node (via wire, wirelessly, etc.) for processing, etc. Four-component (4C) borehole or marine seismic data can be acquired using three orthogonally-oriented geophones and a hydrophone within an ocean-bottom sensor (deployed in node-type system, a cable-type system, etc.). A 4C node in contact with the seabed (formation) can measure shear waves (geophone-based sensing) and can measure compressional waves (hydrophone-based sensing).

A source or source array may be activated periodically, such as about each 25 m (about at 10 second intervals) where the resulting sound wave travels into the Earth, which may be reflected back by one or more rock layers to one or more sensors, which may then be relayed as signals (data, information, etc.) to equipment.

Pressure data may be represented as "P" and velocity data may be represented as "Z"; noting, however, that the vertical component of a measured particle velocity vector may be denoted "V" and that "Z" may refer to a scaled, measured particle velocity. "V" may represent a measured velocity and "Z" may represent a scaling thereof.

As mentioned, a hydrophone can sense pressure information (P data) and a geophone may sense velocity information (V and/or Z data). A hydrophone may output signals, optionally as digital data for receipt by a system. A geophone may output signals, optionally as digital data for receipt by a system. The system 360 may receive P and V/Z data via one or more of the one or more network interfaces 370 and process such data via execution of the instructions 380 stored in the memory 368 as accessed by one or more of the one or more processors 366. The system 360 may store raw and/or processed data in one or more of the one or more information storage devices 362.

Referring again to the survey system 300 of FIG. 3, one of the nodes 310 may be connected to one or more other nodes of the nodes 310 via a cable. A vessel may include a cable that is operatively coupled to at least one node. In the survey system 300 of FIG. 3, nodes may be deployed according to a survey plan in a grid pattern; consider placement of nodes on a seabed according to an x,y grid where distance between adjacent nodes may be of the order of hundreds of meters. As shown in the survey system 300, the seismic source vessel 340 may be employed with the one or more sources 342 that can emit energy, which can, in turn, be received via one or more of the nodes 310.

Figure 4:
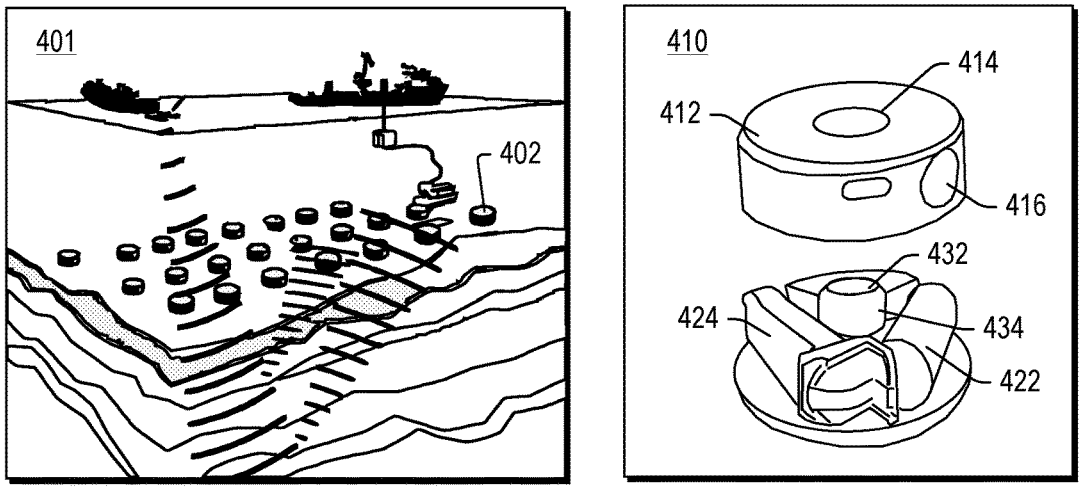
FIG. 4 illustrates a node, an accelerometer and a hydrophone.

FIG. 4 shows a geologic environment 401 that includes nodes 402, a node 410, an accelerometer 440 and a hydrophone 480. As shown in FIG. 4, the node 410 can include a top cover 412, a communication antenna 414, an interface 416, one or more batteries 422, a recorder 424, a hydrophone sensor package 432 and a geophone sensor package 434. The recorder 424 can record information acquired by the hydrophone sensor package 432 and/or the geophone sensor package 434.

Information acquired by the node 410 may be transmitted via the communication antenna 414 to a receiver, which may be part of communication equipment carried by a vessel, etc. The node 410 may be positioned on a seafloor via a vehicle (a remotely operated vehicle, a robot, etc.).

As shown in FIG. 4, the nodes 402 may be positioned over a particular area of the seafloor as specified by a seismic survey plan. The nodes 402 may be positioned in a grid pattern. Such a grid pattern may specify a distance or distances between neighboring nodes. An array of nodes such as the nodes 402 may be referred to as a patch. Information acquired by nodes can be processed and analyzed to increase understanding of structures in a subseafloor environment.

One or more of the accelerometers 440 may be included in the geophone sensor package 434. As to the hydrophone sensor package 432, it can include a single pressure sensor or more than one pressure sensor.

As shown in FIG. 4, the accelerometer 440 can include a system clock generator 444, a jitter filter 446, a pulse generator 448, a return connection 449, a sensor 450, a charge amplifier 451, an adder 454, a resistor 456, an adder connection 457, an amplitude detector 460, a loop controller 464, a digital output 470 and logic 472 with complimentary drivers 474 and 476.

In FIG. 4, the accelerometer 440 can include a capacitive MEMS-based sensor. As illustrated in FIG. 4, the sensor 450 can include an armature and a pair of fixed position electrodes attached to the armature. A sensor may include a differential capacitor, in which a mobile electrode moves along a sensitive axis in response to an external acceleration.

The accelerometer 440 may be subjected to inertial forces caused by an external acceleration where a proof mass may be kept in an equilibrium position by electrostatic forces controlled via feedback circuitry. In FIG. 4, the amplitude detector 460 and the loop controller 464 can provide a substantially high gain where residual movement of a mobile mass with respect to its equilibrium position may be kept close to a null point. In such an approach, magnitude and direction of a net restoring force can be a difference between attractive forces working in opposite directions.

A type of noise, referred to as sampling noise, can be defined as kT/C noise (thermal noise), which may be introduced by switching and can degrade a dynamic range of a sensor. In FIG. 4, the accelerometer 440 can include the charge amplifier 451 configured with an input terminal that is continuously connected to a mobile electrode (during times in which the sensor 450 receives both actuation and activation voltages). In such an approach, sampling noise can be reduced in comparison to circuitry that does not include such a configuration of components.

In FIG. 4, the accelerometer 440 can include a constant charge drive for the sensor 450. The charge amplifier 451 of the accelerometer 440 can modulate, or adjust, actuation voltage based on a proof mass movement, which may thereby increase available signal-to-noise ratio. As shown in FIG. 4, a feedback network can be associated with the charge amplifier 451. An output terminal of the amplifier 452 can be connected via the adder connection 457 to the adder 454, which can combine an output signal from the amplifier 452 with a supply voltage $V_{supp}$. In such an arrangement, the supply voltage that is applied to the logic 472, from the adder 454, can be modulated according to a sensed signal that as available at the output terminal of the amplifier 452; and as a result, the actuation force can be independent of the proof mass movement.

A sensor package may include a three component (3C) particle motion sensor assembly; consider a 3C accelerometer assembly. Such an assembly may acquire inline (x), crossline (y) and vertical (z) particle acceleration measurements; consider an accelerometer assembly that includes microelectromechanical system (MEMS) sensor units that sense accelerations along respective inline (x), crossline (y) and vertical (z) axes. A grid of a survey may be defined via a corresponding coordinate system (at least in inline (x) and crossline (y) directions). In a package, orientations of MEMS sensor units may be appropriately varied for purposes of alignment with corresponding axes.

In FIG. 4, as shown in an approximate cross-sectional view, the hydrophone 480 can include a sheath 481, a core 482, an electrode 483 and at least one piezoelectric element 484-1 and 484-2, which may be a ceramic-based piezoelectric element or elements. As shown, a potential (V) may be measured across wires 485 and 487 where the potential (V) varies based at least in part on response of the at least one piezoelectric element 484-1 and 484-2 to external forces such as pressure and/or acceleration.

A piezoelectric material can produce an electrical potential when it is subjected to physical deformation. A piezoelectric material can include a crystalline structure (quartz, tourmaline, a poly-crystalline ceramic, etc.). A lead zirconate titanate (PZT) may be utilized.

A hydrophone can include a plate of piezoelectric ceramic placed on an elastic electrode. In such an approach, the active element can be deformed by pressure variations in surrounding water and produce a voltage collected between the electrode and a terminal bonded to the other face. The electrode can rest on a metallic core that supports its ends and that may also limit its maximum deformation (to avoid damage to the ceramic). A hydrophone can be configured to preserve integrity even where it may be accidentally submitted to high pressures.

As the active element has mass, it can produce a voltage when it is subjected to acceleration. To diminish the effect of acceleration, a hydrophone can be assembled with elements that may be paired, as shown in FIG. 4 (see elements 484-1 and 484-2 with respect to the direction of acceleration). In such an arrangement, voltage produced by acceleration can cancel whereas voltage produced by pressure can add. While voltage is mentioned, a hydrophone may be configured with circuitry such that current provides an indication of sensed pressure.

As mentioned, a 4D seismic survey involves acquisition of 3D seismic data at different times over a particular area. Such an approach can allow for assessing changes in a producing hydrocarbon reservoir with respect to time. Changes may be observed in one or more of fluid location and saturation, pressure and temperature. 4D seismic data can be considered to be a form of time-lapse seismic data.

Nodes can be utilized as an alternative to permanent seabed cables, which have been installed in various fields to acquire 4D seismic data. Nodes can be deployed to acquire seismic data (4D seismic data) and can be retrievable after acquisition of the seismic data. A 4D seismic survey may call for one or more processes aimed at repeatability of data.

One factor affecting repeatability of seismic data can be the difference in position of the receiver and the source between the two phases of a 4D survey (a baseline survey phase and a monitor survey phase).

The nodes 402 illustrated in FIG. 4 may be seismic seabed nodes that can be utilized to perform a 4D seismic survey. As mentioned, the nodes 402 may be deployed via use of a ROV. A time lapse survey can include a baseline survey phase and a monitor survey phase where each phase includes positioning nodes at locations on a seafloor. Multiple monitor surveys may optionally be performed.

Quality of 4D seismic data can depend in part on repeatability of source and receiver positions between a baseline survey phase and a monitor survey phase. Positioning repeatability demands may be determined as part of a survey development stage. Positions, as to repeatability, may be monitored during acquisitions associated with a baseline survey phase and a monitor survey phase. Such a process may be referred to as position monitoring. A survey can include monitoring positioning repeatability during acquisition such that reshoots and/or infills planned.

A framework may be implemented to monitor 4D positioning repeatability during marine acquisitions. For each trace of a monitor survey a matching function can be used to search for the most similar trace in a baseline dataset. Similarity of traces can be expressed using the normalized root mean square (NRMS). For a pair of matching traces, a number of positioning difference attributes may be derived and mapped. Such attributes can be calibrated against NRMS values measured on 4D seismic difference data. In such an approach, positioning acceptance criteria can be set based on NRMS demands for a survey. 4D positioning measurements can help to define re-shoots and infill during acquisition and may provide insight into quality and repeatability of 4D seismic data.

In an effort to acquire more subtle 4D signals, a survey may aim to reduce an NRMS value to about 10 percent or less with a corresponding source positioning error plus receiver positioning error of about 10 meters to about 80 meters, which may depend on overburden heterogeneity. Higher quality 4D survey data points may be associated with about 25 meter to about 40 meter repeatability to produce NRMS levels that are less than about 10 percent (for seismic streamer surveys of regions underlying the North Sea).

A baseline survey can include positioning of nodes according to a first grid in a first region, gathering the nodes, positioning the nodes according to a second grid in a second region, gathering the nodes and repositioning them according to the first grid in the first region (for a time-lapse survey of the first region). The nodes 402 may be positioned according to a first grid, utilized to acquire data, positioned according to a second grid and utilized to acquire data. A survey may aim to position nodes at locations that were previously used (repositioning of nodes). Such a survey may reuse nodes or may utilize new or different nodes.

A survey can include a data repeatability process where an ROV or other suitable equipment is utilized to deploy nodes at prior positions of a grid associated with a baseline survey phase of a 4D seismic survey. In such an approach, the nodes are to be repositioned as closely as possible to their prior positions. This may be considered to be a constraint on the data repeatability process. To meet such a constraint, an operator of an ROV may spend a considerable amount of time in deploying nodes to their prior positions.

A method can include deploying nodes with relaxed placement accuracy. A method can include calculating (estimating) seismic data at a baseline node position that is a short distance away from a location of a seabed receiver, using data recorded by sensors at that seabed receiver, including seismic and seismic gradient sensors. For a survey, nodes may be deployed via an ROV, via a rope or via one or more other techniques. A rope based approach may provide for coverage of an area in a more expeditious manner than an ROV based approach that places nodes one node at a time.

As to streamer based approaches, one approach to predict the seismic data at the same location as for a previous survey, even if the receivers are located differently, can involve interpolating or reconstructing the seismic data between receivers. For towed streamer data, a method can include reconstructing seismic data between receivers using gradients where measurements of the wavefield and its gradients are available. In such an approach, via use of known gradients, it is possible to reconstruct data (values) above the Nyquist spatial sampling criteria; however, such an approach can depend on spacing, as it may be problematic to reconstruct between receivers separated by distances of more than about 125 meters to about 150 meters.

As to a node based approach, for a 4D seabed node survey, the node spacing may be of the order of 100 meters or more. A seabed node survey can utilize spacing of the about 300 meters to about 400 meters. In such an approach, accurate reconstruction of seismic data using gradients between nodes can be problematic.

A method can include estimating seismic data in a position a distance away from a location of a seabed receiver where such a method includes using data recorded by sensors at the seabed receiver where the seabed receiver includes seismic and seismic gradient sensors.

A method can include using two components of a wavefield gradient to determine local propagation characteristics of recorded wavefronts on the seabed (as recorded by nodes). With such information, for each identified wavefront, a phase shift can be derived to estimate the wavefront that would have been recorded had the node been located at a nearby position where a seismic receiver was not located. In such an approach, by decomposing the seismic wavefield, a number of recorded wavefronts can be identified, and an estimate of the entire recorded wavefield at the nearby position can be created.

Figure 5:
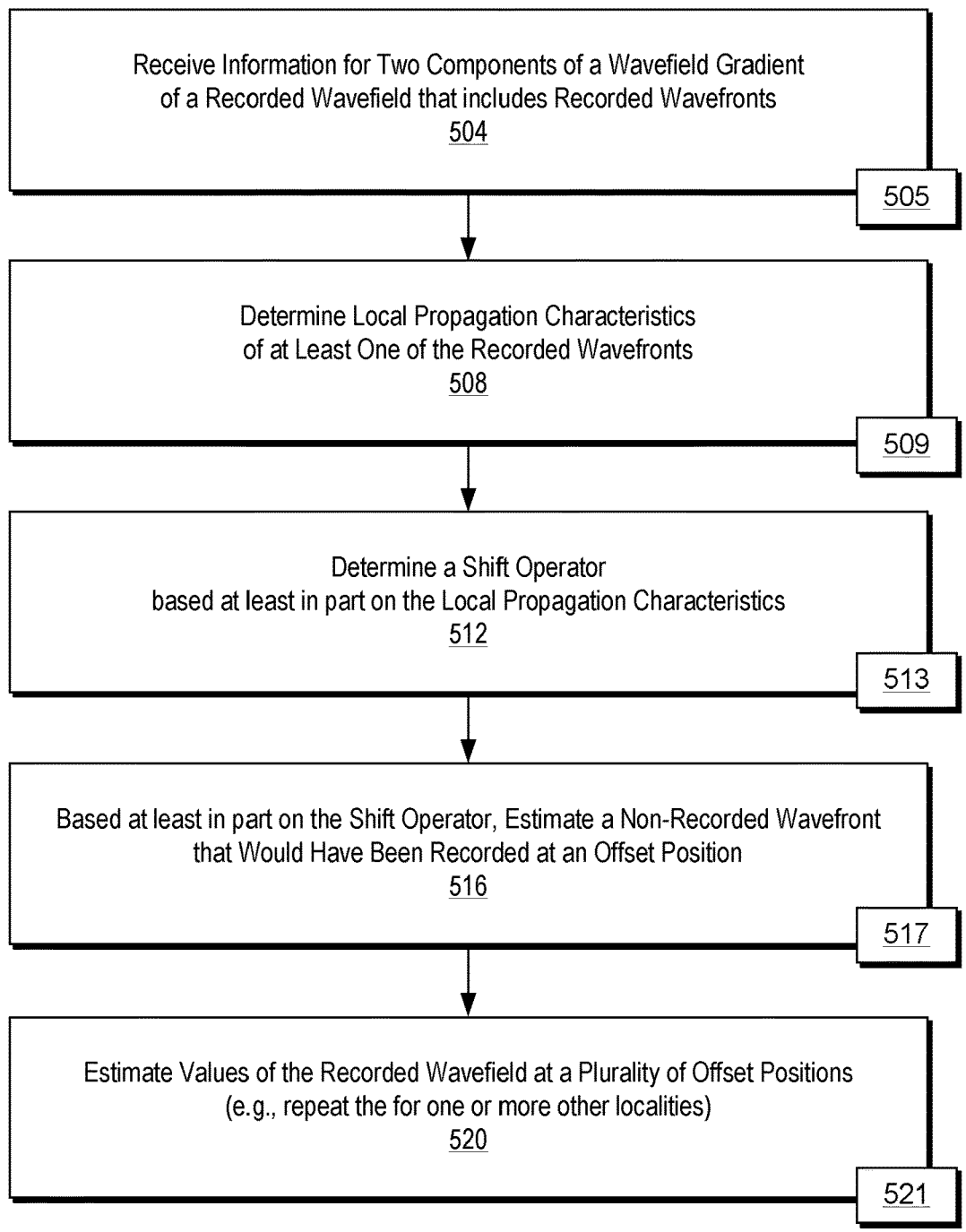
FIG. 5 illustrates a method.

FIG. 5 shows a method 500 that includes a reception block 504 for receiving information for two components of a wavefield gradient of a recorded wavefield that includes recorded wavefronts where the information is based at least in part on data acquired by a plurality of spaced sensors of a sensor group at a sensor group position on a seabed; a determination block 508 for determining local propagation characteristics of at least one of the recorded wavefronts; a determination block 512 for determining a shift operator based at least in part on the local propagation characteristics; and an estimation block 516 for estimating, based at least in part on the shift operator, a non-recorded wavefront for an offset position that is offset from the sensor group position. Such a method may be repeated to estimate values of the recorded wavefield at a plurality of offset positions (for one or more other sensor groups, etc.). Such a method may be part of the method 350 of FIG. 3.

The method 500 of FIG. 5 may optionally be used together with time shift alignment, as the cumulative effect of different processes that reduce mis-match between monitor and baseline surveys can result in further reducing the differences. The method 500 is shown in FIG. 5 in association with various computer-readable media (CRM) blocks 505, 509, 513, 517 and 521. Such blocks generally include instructions suitable for execution by one or more processors (or cores) to instruct a computing device or system to perform one or more actions. While various blocks are shown, a single medium may be configured with instructions to allow for, at least in part, performance of various actions of the method 500. A computer-readable medium (CRM) may be a computer-readable storage medium that is not a carrier wave, that is not a signal and that is non-transitory. The blocks may be provided as instructions such as the instructions 380 of the system 360 of FIG. 3.

A method can include predicting (estimating) seismic data in a position a short distance away from the location of a seabed receiver via data recorded by sensors at the receiver that include seismic and seismic gradient sensors. Such seismic data can be generated seismic data, which may be a form of synthetic seismic data because seismic data were not actually acquired at the position that is a short distance away from the location of the seabed receiver, which can be a seabed node with spaced seismic sensors.

Figure 6:
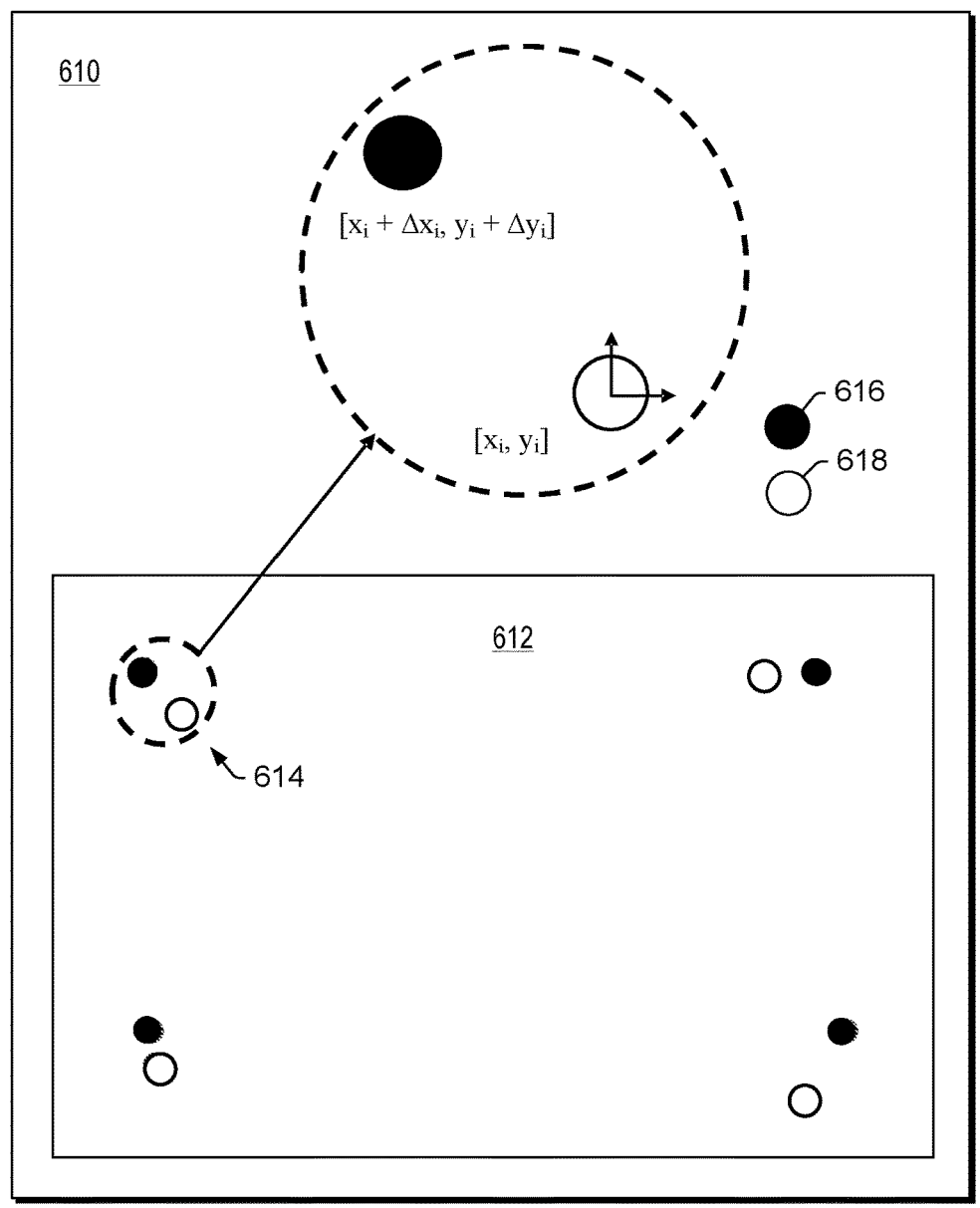
FIG. 6 illustrates a scenario and a method.
Figure 6:
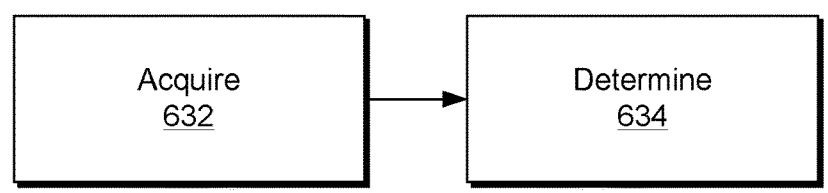

FIG. 6 shows an environment 610 that includes a seabed 612 (a seabed surface) that includes various positions including a particular region 614 for an i-th node location. Such a diagram may be considered to be a nodal geometry diagram where black filled circles 616 indicate node positions for a monitor survey and where white filled circles 618 indicate positions for a corresponding baseline survey. Each circle may represent a sensor group position where a sensor group can be a sensor group of a node or a plurality of nodes or units that may be closely spaced to form a group.

For the particular region 614 for the i-th node location, the monitor survey has coordinates $[x_i, y_i]$ and the baseline survey has coordinates $[x_i+\Delta x_i, y_i+\Delta y_i]$. Whereas the baseline survey may have solely recorded the pressure wavefield and one or more components of particle velocity, the monitor survey records these quantities and at least two horizontal gradients of the pressure wavefields; noting that the gradient of the particle velocity wavefields may also be recorded.

A method can utilize gradient measurements available in (at least) a monitor survey at the location $[x_i, y_i]$ and to use them to predict the wavefield as if it had been recorded at the location $[x_i+\Delta x_i, y_i+\Delta y_i]$. Such a method can be performed on the basis that the availability of wavefield gradients allows for estimation of local propagation characteristics (consider wavenumber components), which can then be used to construct extrapolation operators.

Where a method can provide for prediction of data at the desired position $[x_i+\Delta x_i, y_i+\Delta y_i]$, such a method can allow for placement accuracy of one or more nodes to be relaxed; consider relaxation from an accuracy of about 5 m accuracy to an accuracy of about 50 m, which may be dependent on complexity of the recorded wavefield and/or complexity of the near-seabed. Such a method can allow for a more efficient deployment of nodes. Such an approach may allow for deployment of nodes optionally without particularly accurate ROV(s); consider deployment achieved using nodes on a rope, which could reduce the cost of a 4D survey.

One or more techniques may be employed to process data to extrapolate seismic data and its gradients. A method may employ Taylor series expansion, which can provide an expression for the wavefield a short distance away from its measurement point. As another approach, consider decomposition of the wavefield, which can include exploiting the ability to extract the propagation characteristics for different events in the seismic data.

A method can include reconstruction via extrapolation. Such a method may reconstruct (extrapolate) the seismic data at position $[x_i, y_i]$ from seismic data recorded at position $[x_i+\Delta x_i, y_i+\Delta y_i]$ via use of gradient sensors to estimate local propagation characteristics of the seismic wavefield. Such an approach may be considered to be "single station" in that it considers each event in the seismic data be isolated, prior to identifying its back-azimuth, and then propagation velocity (or alternatively, the slowness/wavenumber components).

A plane wave can propagate in a direction with respect to time such that the amplitude of the plane wave may be represented by a function, which may remain relatively constant where the phase of the plane wave remains relatively constant; consider a plane wave that propagates in a direction x where a function f depends on time t. In such an approach, a phase speed of the plane wave may be given by: $c=((x_1-x_0)/(t_1-t_0))$. A wavefront may behave locally as a plane wave. A relationship between wavenumber (k) and angular frequency ($\omega$) can be given by: $k=(\omega/c)$. Further, a relationship between wavenumber (k) and wavelength ($\lambda$) may be given by: $k=(2\pi/\lambda)$. In a direction x, horizontal wavenumber may be represented as $k_x=(\omega/c_x)=\omega p_x$, and in a direction y, horizontal wavenumbers may be represented as $k_y=(\omega/c_y)=\omega p_y$, where $c_x$ and $c_y$ are the apparent velocities (phase speeds) in the x- and y-direction, respectively, and $p_x$ and $p_y$ are the apparent slownesses in the x- and y-direction, respectively.

A method can include consideration of a single seismic event, $d_n(f,x_i,y_i)$, of a plurality of recorded events, where $x_i$ and $y_i$ are the horizontal coordinates, and f is the frequency. If $k_{xn}$ and $k_{yn}$ represent the horizontal slownesses of this n-th event, then the horizontal gradients $d_{xn}(f,x_i,y_i)$ and $d_{yn}(f,x_i,y_i)$ of these events can be represented as follows:

$$d_{xn}(f,x_i,y_i)=jk_{xn}d(f,x_i,y_i), \quad (1)$$

and $$d_{yn}(f,x_i,y_i)=jk_{yn}d(f,x_i,y_i). \quad (2)$$

Using the ratios of Equations (1) and (2) to $d_n(f,x_i,y_i)$ then provides:

$$-j\frac{d_{xn}}{d_n}=k_{xn} \text{ and} \quad (3)$$

$$-j\frac{d_{yn}}{d_n}=k_{yn} \quad (4)$$

Thus, for an isolated event, the ratios of the gradient wavefields to the pressure wavefield can be utilized to determine the wavenumber components corresponding to that event. Such an approach can be considered to be a decomposition approach as it involves decomposing the wavefield into local propagation velocities at the receiver.

As to a scenario where the location $(x_i, y_i)$ was not the desired location for time-lapse repeatability, but that the desired location was $(x_i+\Delta x_i, y_i+\Delta y_i)$, the desired location can be predicted as follows:

$$d_n(f,x_i+\Delta x_i,y_i+\Delta y_i)=d_n(f,x_i,y_i)\cdot\exp(jk_{xn}\Delta x_i+jk_{yn}\Delta y_i). \quad (5)$$

where the operator $\exp(jk_{xn}\Delta x_i+jk_{yn}\Delta y_i)$ is a phase shift operator that predicts how the single plane wave event in the data would have appeared had it been recorded at the desired location $(x_i+\Delta x_i, y_i+\Delta y_i)$ where that single plane wave event is a non-recorded single plane wave event.

Thus, by using the recorded wavefield plus the horizontal gradients of the recorded wavefield, a method can include determining the local wavenumber components of that event at the receiver location. In such an approach, those local components can then be used to determine a shift operator, $\exp(jk_{x,n}\Delta x_i + jk_{y,n}\Delta y_i)$, that repositions the seismic wavefield a small distance away.

A method can include local wavefield property estimation to derive a positional shift operator. Note that while the above approach references a single frequency, a method may include averaging the estimation of the wavenumbers over one or more of source positions, times, frequencies, etc. Such an approach (or approaches) may optionally be implemented to address noisy and/or complex data.

A method may be employed to address a single isolated event to be accurate over short distances where an assumption is made as to local homogeneity around the receiver location.

FIG. 6 also shows a method 630 that can include, for a site associated with a monitor survey phase of a 4D seismic survey, an acquisition block 632 for acquiring pressure wavefield information via an assembly of hydrophones at the site where the pressure wavefield information includes pressure wavefield gradient information; and, for a site associated with a baseline seismic survey of the 4D seismic survey, a determination block 634 for determining pressure wavefield information based at least in part on the acquired pressure wavefield information and the pressure wavefield gradient information.

Figure 7:
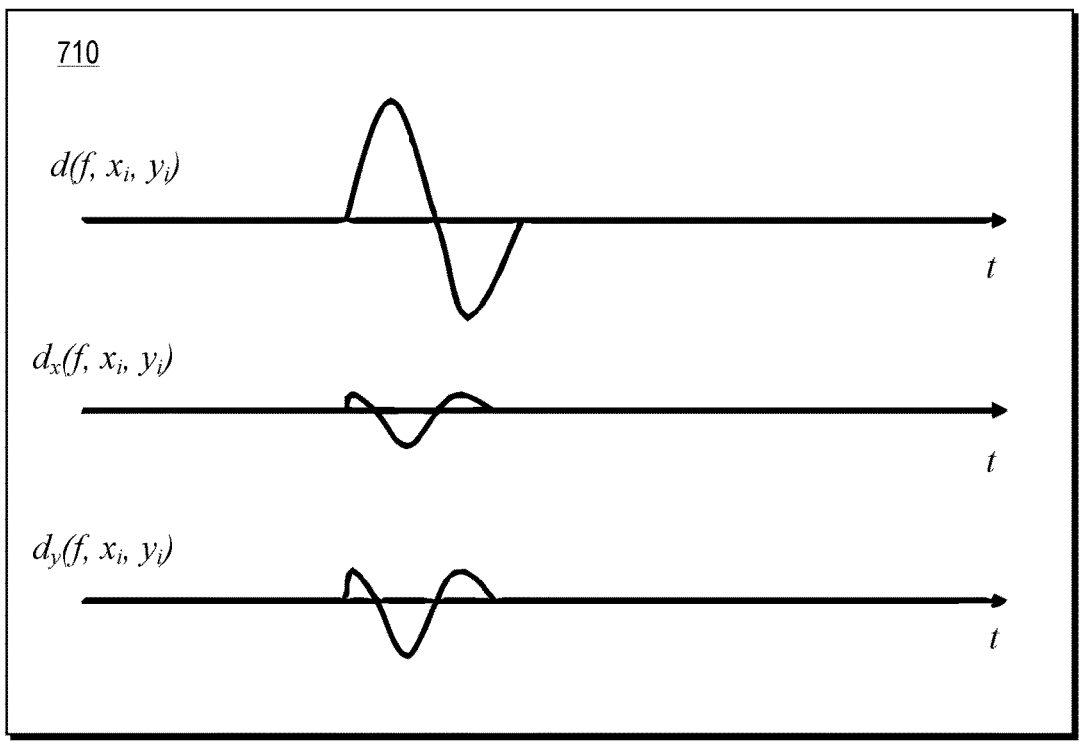
FIG. 7 illustrates plots.
Figure 7:
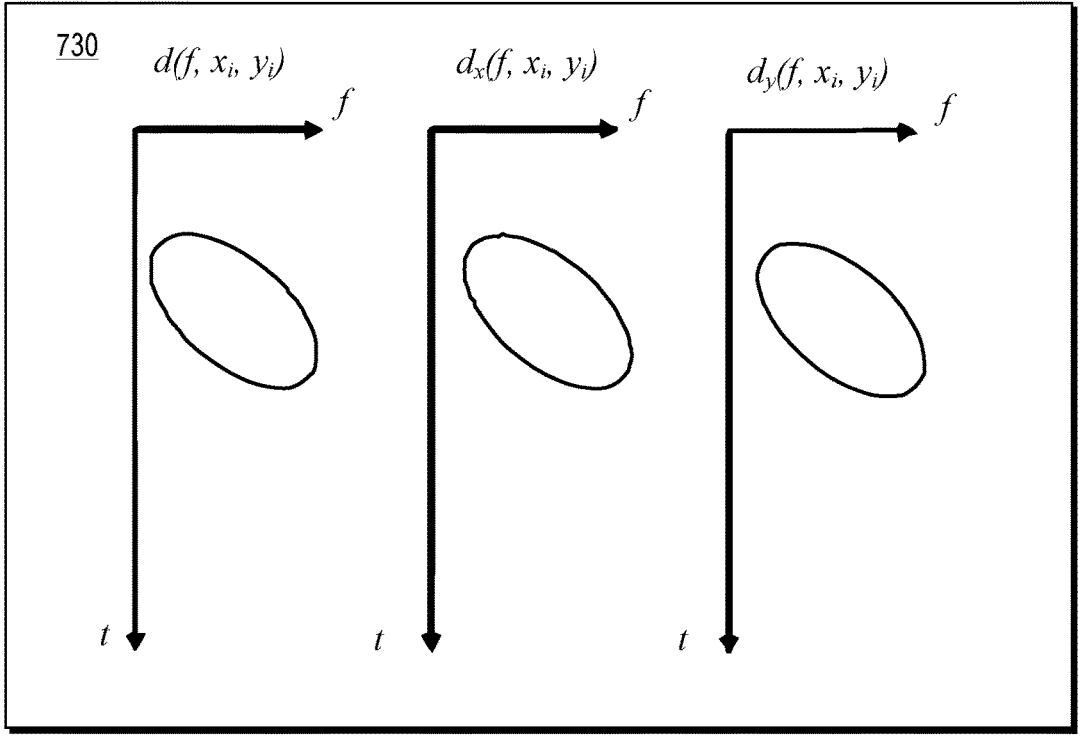

FIG. 7 shows plots 710 and 730 of an ideal situation of a single event observed for each of the recorded components. In particular, the plot 710 shows a single event that is observed on each of the recorded components (pressure, and 2-components of pressure gradient) and the plot 730 shows the same data but transformed into a time-frequency domain, where events with different frequency content can be separated.

Due to the use of amplitude ratios, such an approach does not account for overlapping events that may change the amplitude by constructive or destructive interference. A combination of time and frequency windowing may be utilized in an effort to isolate events. Such an approach may separate events that arrive at similar times, but with different frequency content (see the plot 730). Such an approach may tend to not reveal more obscure weaker events that contain information, particularly in time-lapse surveys where small amplitude differences can be substantial.

Figure 8:
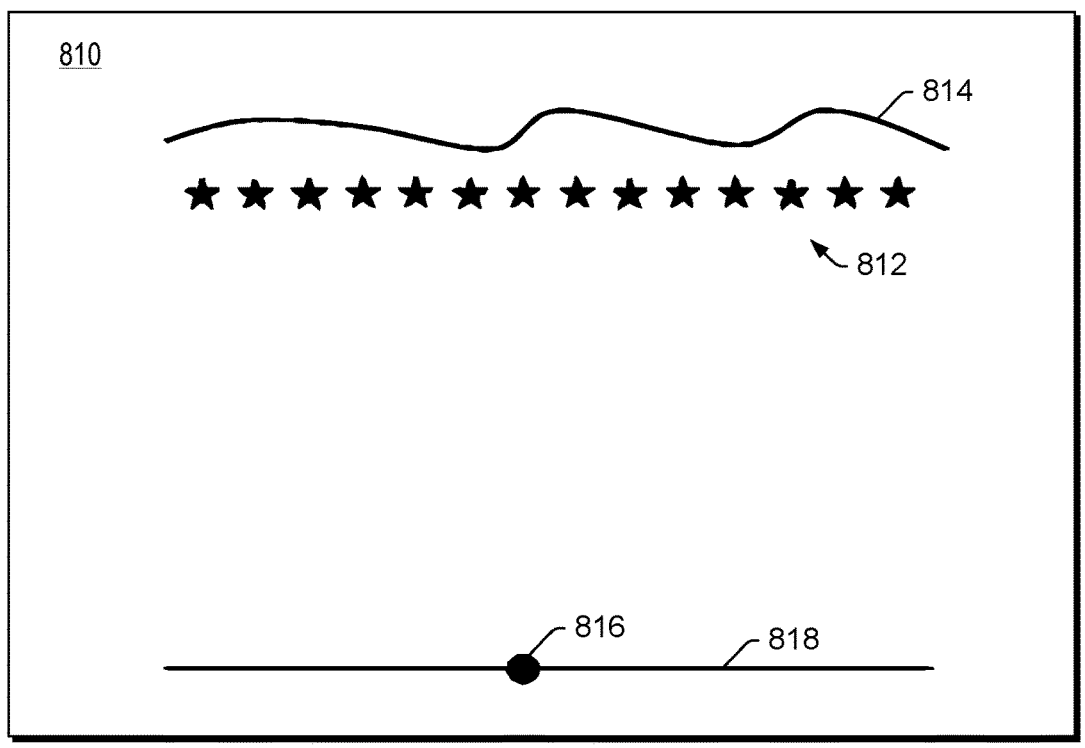
FIG. 8 illustrates plots.
Figure 8:
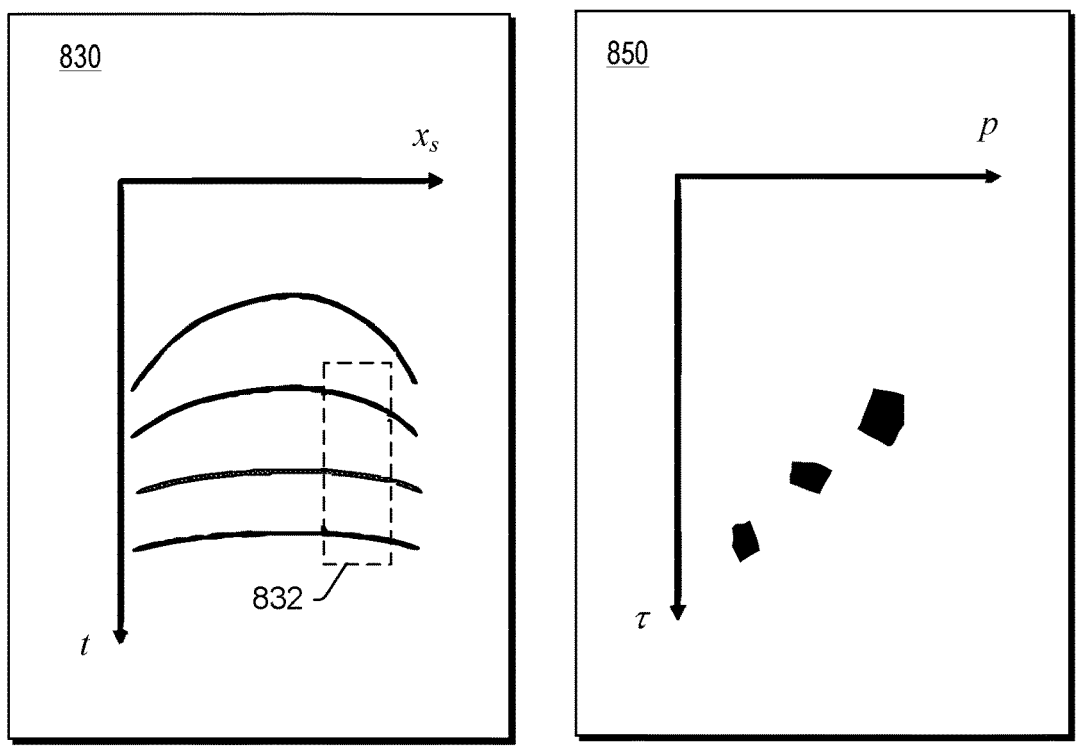

FIG. 8 shows a series of plots 810, 830 and 850. In FIG. 8, the plot 810 shows a 2D representation of an ocean bottom node (OBN) geometry where stars indicate (relatively) densely sampled sources 812 located just beneath the sea surface 814 and where a black, filled circle represents a node 816 on the seabed 818. As to the plot 830, it shows representation of a shot gather and, as to the plot 850, it shows a representation of the intercept time-slowness (tau-p) decomposition of the data in the dashed box 832 of the plot 830.

In ocean bottom acquisition, sources may be arranged according to a dense grid as shown in the plot 810 (of an ocean bottom node (OBN) survey). Such an arrangement of equipment may provide for decomposing a wavefield. A method can include performing decomposition for each source location in turn (since the observed wavefield may be different for each source position) or to use a small number of sources at the same time, since for some events it can be expected that relatively small changes exist across a small number of sources. The wavefield observed at the node in the plot 810, due to the plurality of sources, can be decomposed into a number of plane waves; consider a method that can include transferring data into the intercept time-slowness (tau-p) domain (see the plots 830 and 850). That is, a method can decompose the data recorded at a single receiver by a plurality of sources into the data recorded at a single receiver due to a single emitted plane wave. In such an approach, where the decomposition is performed for small time and offset windows, the data are more likely to be represented by linear plane waves, which can help to ensure that a small number of plane waves can be utilized (see the plot 830). Such a decomposition can be conducted for a number of plane waves to adequately describe the emitted wavefield and, in such an approach, for each of these plane waves, there can be expected a recorded wavefield that includes less events than the equivalent recorded wavefield due to the "omni-directional" source that emitted in various directions simultaneously.

As explained above, a method can include decomposing a wavefield on a source side, which can help to simplify a received wavefield.

In some ocean bottom acquisitions, a denser source sampling than that utilized for acquisition may be desired for processing. Interpolation may be utilized to estimate a denser wavefield. Depending on the basis functions used for interpolation, the source wavefield may be decomposed into a particular domain. If basis functions with a linear phase function are used, then the source wavefield may be decomposed into emitted plane waves. Thus, the source side plane wave decomposition, as described above, may occur within such an interpolation. In such an approach, for each plane wave component identified during reconstruction, the shift operator can be determined, and applied to the interpolated output. Such an approach may provide a benefit in that during certain types of interpolation (such as matching pursuit), the largest components are solved first, and are then removed from the input data. Thus, the wavefield can be decomposed to assist in the isolation of events at the receiver and the strongest event can be removed from the input data at each iteration of a plurality of iterations. Such a method can allow for weaker events to be gradually revealed in a manner that reduces issues related to overlapping events.

A method can include integrating a positional shift on a receiver side into a source side reconstruction algorithm.

Figure 9:
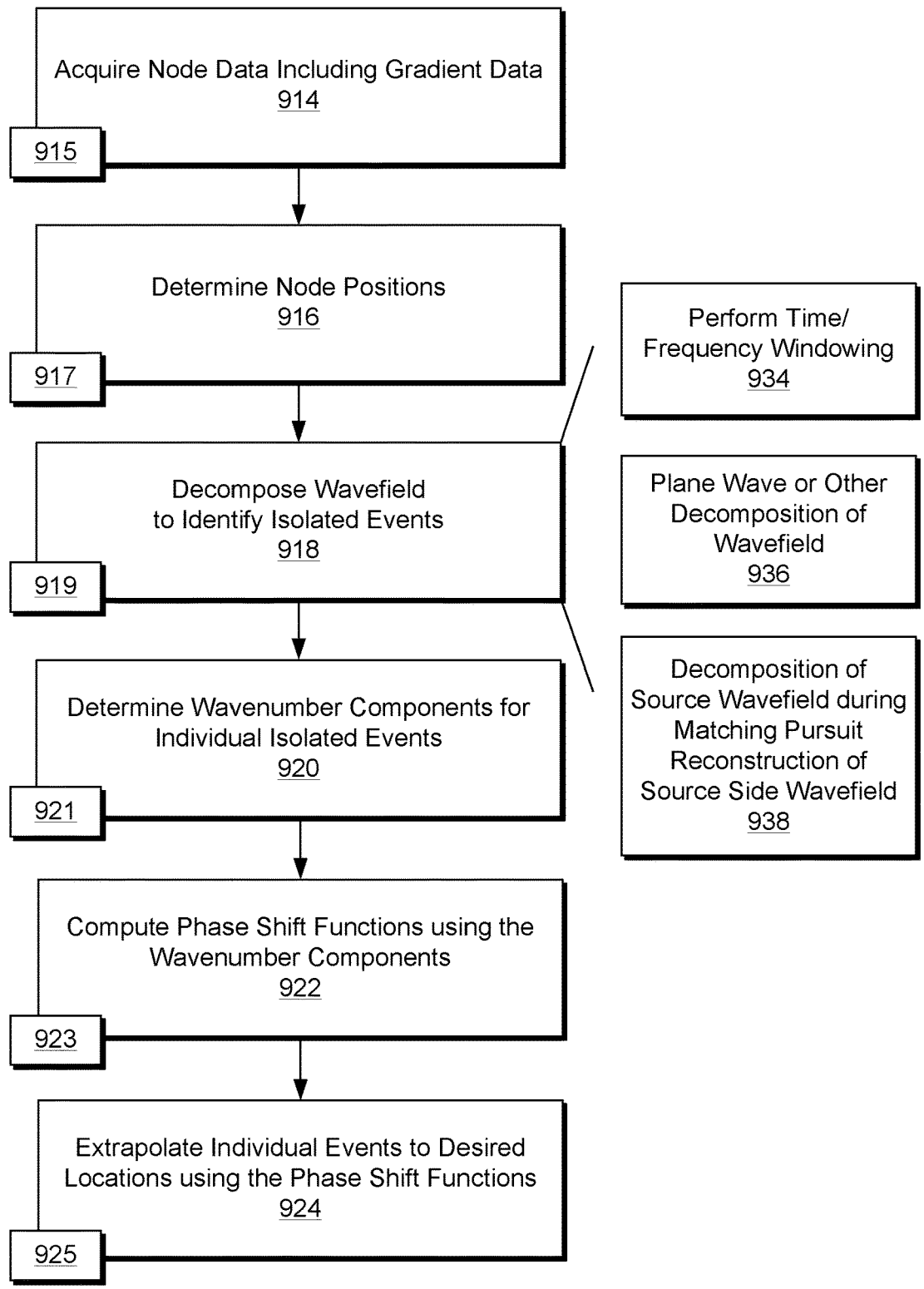
FIG. 9 illustrates a method.

FIG. 9 shows a method 910 that includes an acquisition block 914 for acquiring node data including gradient data, a determination block 916 for determining node positions, a decomposition block 918 for decomposing a wavefield to identify isolated events, a determination block 920 for determining wavenumber components for individual isolated events (for each identified event, computing amplitude ratios and using the amplitude ratios to determine the wavenumber components for that event), a computation block 922 for computing phase shift functions using the wavenumber components, and an extrapolation block 924 to extrapolate the individual events to desired locations using the phase shift functions.

In FIG. 9, the decomposition block 918 may include one or more techniques that can assist in isolating different seismic events; consider time and/or frequency windowing 934, plane wave (or other) decomposition of the source wavefield 936 and/or decomposition of the source wavefield during matching pursuit reconstruction of the source side wavefield 938.

The method 910 is shown in FIG. 9 in association with various computer-readable media (CRM) blocks 916, 917, 919, 921, 923 and 925. Such blocks generally include instructions suitable for execution by one or more processors (or cores) to instruct a computing device or system to perform one or more actions. While various blocks are shown, a single medium may be configured with instructions to allow for, at least in part, performance of various actions of the method 910. A computer-readable medium (CRM) may be a computer-readable storage medium that is not a carrier wave, that is not a signal and that is non-transitory. The blocks may be provided as instructions such as the instructions 380 of the system 360 of FIG. 3.

The method 910 may be performed for a survey technique that utilizes a system such as the survey system 300 of FIG. 3. Nodes of a seabed acquisition system can include within each node (a receiver point) seismic sensors for measuring one or more of four components: pressure and the three components of particle velocity and at least an approximately horizontal gradient of the pressure.

Gradient may be measured by using several hydrophones (via difference of their outputs), by using several geophones (via difference of their outputs), and/or by using rotation sensors.

Figure 10:
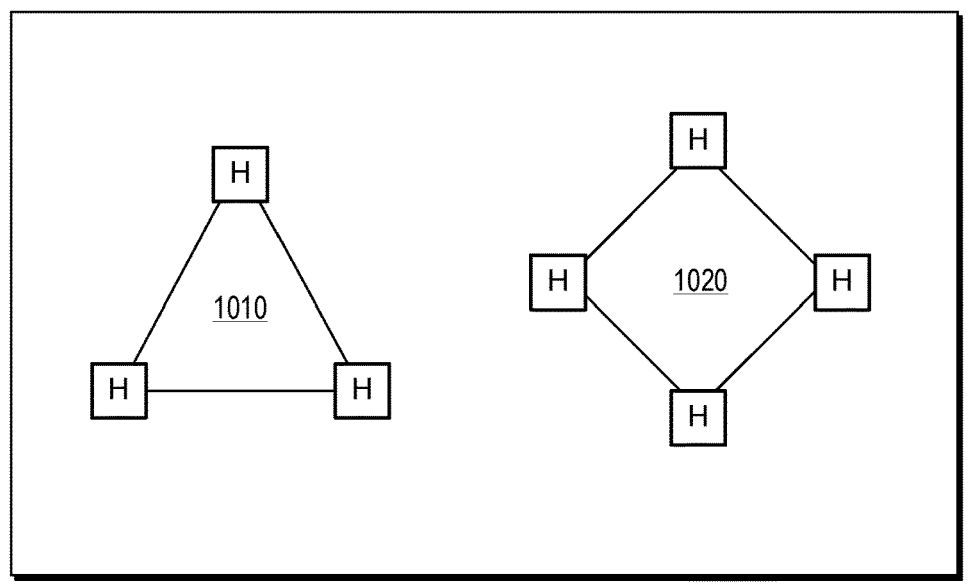
FIG. 10 illustrates assemblies.
Figure 10:
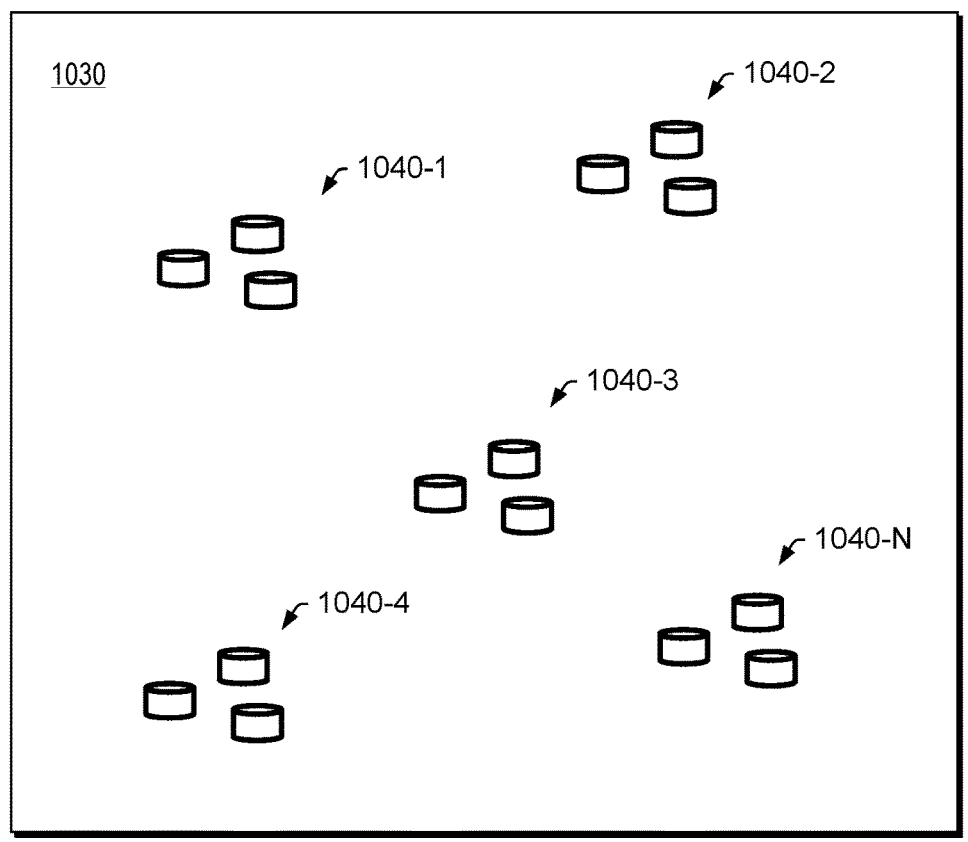

FIG. 10 shows some arrangements of sensors 1010, 1020 and 1030. Sensors can be in one common sensor housing, in groups of about 3, about 4 or more per the arrangements of sensors 1010 and 1020 or in a number of closely spaced (about 20 cm to about 3 m) housings, which may be interconnected or not, per the arrangement of sensors 1030. A method may be utilized for nodal systems and/or cabled systems. In the arrangements of sensors 1010 and 1020, the letter "H" indicates hydrophone; noting that other sensors may be included.

A method can include placement of nodes putting nodes in desired locations. A method can include positioning or locating nodes, which can include measuring positions or locations of nodes. A geophone can be a particle motion sensor or sensors for measuring one or more of acceleration, velocity or displacement.

A combined source and receiver approach can include decomposing a wavefield on both the source side and on the receiver side. In some instances, array approaches may be used to simultaneously decompose source and receiver arrays into plane wave components; consider an approach for interpolation and processing of both source and receiver wavefields where the source side wavefield is decomposed into plane wave (or other) components and where the receiver wavefield is decomposed into events with identified slownesses. In such an approach, the identified slownesses can be used to compute a shift operator on the receiver side (a shift function).

When the gradient is measured using the difference of outputs, the response of the gradient may deviate from a theoretical gradient response, particularly at higher frequencies. In such an approach, the expression for the gradient may be given as follows: $2j \sin(rk_{xn})/2r$ (rather than $jk_x$ as used in Equation (1)), where r is half of the distance, measured in the direction x, between the two recording devices whose output is being differenced. Where the foregoing expression is used, a method can include predicting wavenumber components from acquired data.

When performed as part of wavefield reconstruction, certain wavenumbers that do not correspond to a time-lapse signal may be excluded from the output extrapolated wavefield. Such wavenumbers will tend to be relatively high, as they will correspond to wavefronts propagating closer to horizontal. Higher wavenumbers are likely to have the highest errors when extrapolating the wavefield, and as such, the exclusion of these wavenumbers can assist in focusing on the time-lapse signal, as well as reducing errors introduced in the extrapolation. For consistency, the same wavenumber approach may be applied to both the baseline and monitor survey.

A gradient may be considered to be a local gradient that may be considered to be relatively accurate within a neighborhood of a node (or pod, etc.) that includes sensors that measured the gradient. A gradient may be multidimensional. Where two sensors can define points of along a line, three sensors may define a plane where differences may be determined in directions within the plane, which may be considered to be two dimensional gradients. Where a node or pod includes a plurality of sensors, multidimensional gradient information may be determined. Gradient information may be 1 D, 2D or 3D. Local gradient information may be utilized to determine values within a neighborhood of a node or pod. Such a neighborhood may be a neighbor defined by a survey where it includes a position associated with one phase of a survey and a position associated with another phase of a survey. Gradient information may allow for comparisons of information acquired during different phases of a survey (a baseline phase, one or more monitor phases, etc.).

A method can include rendering a graphic of neighborhood and gradient information within the neighborhood where such gradient information may be extrapolated from differences in measurements of sensors; consider sensors that are within a node at different positions within that node.

A node can include a perimeter where sensors are spaced apart along or proximate to the perimeter (to increase spacing between the sensors). Where a node has a cylindrical shape, three sensors may be disposed at points defined by a circumscribed triangle within a circle. Where a region is steep (depth-wise) sensors may be spaced as to height, where a base of a node defines a base plane and where sensors are in a plane parallel to the base plane, placing the node on a sloped seabed may place the sensors in a plane substantially parallel to that of the sloped seabed. A node can include a tilt sensor, which may indicate how a node is oriented on a sloping seabed. Such information may be utilized at least in part to determine one or more gradient directions to determine how sensors may be oriented with respect to slope of a sloping seabed.

A node can include two sensors that are spaced apart. In such an approach, the node may include circuitry and/or a mechanism that can orient the two sensors; consider compass circuitry that can determine a direction and orient the two sensors along a line that is substantially aligned with a desired direction (N, S, E, W, etc.). In such an approach, the node may include a turntable to which the sensors are mounted.

Through use of gradient information, positioning demands may be relaxed for placement of nodes (in a baseline survey and/or a monitor survey). A survey may include specifications as to positioning nodes of a monitor survey (monitor survey phase). Where gradient information (sensed pressure gradient, etc.) is available for nodes, a survey may specify a distance limit of the order of tens of meters; whereas, without such gradient information, a distance limit may be of the order of about 10 meters or less (about 5 meters).

Where a distance limit for node positioning is relaxed to being of the order of tens of meters, deployment of nodes may be performed more expeditiously. An ROV may choose a path based on ease of movement across a seabed rather than based on fulling a relatively small distance specification about a target location. Deployment of sensors may occur via a rope based approach, which may be expeditious as well.

A seabed acquisition system can include receiver points that include seismic sensors (one or more of P, Z and optionally X and Y) and P-wave gradient sensors. In such a system, a gradient can be measured using several hydrophones (via difference of their outputs) and by using several geophones (via difference of their outputs) or by using rotation sensors. Sensors can be in one common sensor housing or in several relatively closely spaced housings (about 20 cm to about 3 meters), which may optionally be interconnected (or independent).

Distances can be known between sensors and angles, etc. For a grid with x, y coordinates, position x and position y may be defined using a coordinate system such as a Cartesian coordinate system (x, y and z).

Where sensors are arranged as members of pods, members of a pod can be in relatively close proximity to each other, one or more techniques may be utilized to determine locations of neighboring members of the pod; consider rangefinder technologies that may use short range electromagnetic energy, acoustic energy, etc. A member of a pod may include a laser suitable for underwater use that can fan a beam or beams out across a region and that can use information associated with the beam or beams to detect neighbors (other members) and their locations relative to each other. In such an approach, the relative locations may be recorded and utilized to determine gradient information for hydrophone data of the members of a pod. Individual members may collect data as to locations of neighboring members where the data once combined allows for determining spatial relationships between the members, which may be used for determining gradient information for hydrophone data.

Figure 11:
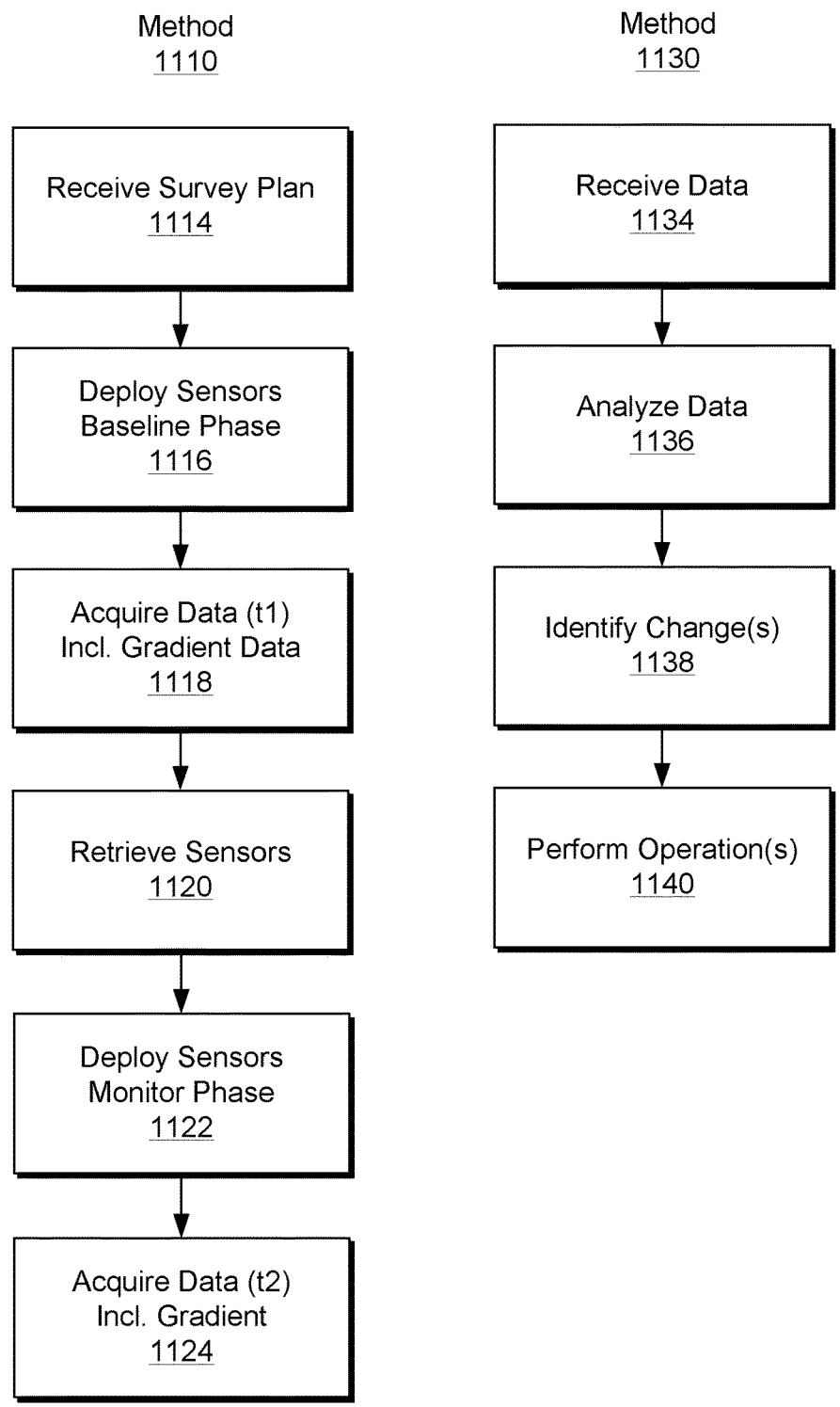
FIG. 11 illustrates methods.

FIG. 11 shows a method 1110 and a method 1130. As shown, the method 1110 includes a reception block 1114 for receiving a survey plan, a deployment block 1116 for deploying sensors according to a baseline survey phase of the survey plan, an acquisition block 1118 for acquiring data at a time t1 where the data includes gradient data, a retrieval block 1120 for retrieving the sensors, a deployment block 1122 for deploying the sensors according to a monitor survey phase of the survey plan and an acquisition block 1124 for acquiring data at a time t2 where the data includes gradient data.

As shown, the method 1130 may follow the method 1110 or the methods 1110 and 1130 may be performed at least in part in an overlapping manner with respect to time. In FIG. 11, the method 1130 includes a reception block 1134 for receiving data that includes gradient data, an analysis block 1136 for analyzing at least a portion of the data, an identification block 1138 for identifying one or more changes in a geologic environment that may have occurred with respect to time (between a time of a baseline survey phase and a monitor survey phase) and a performance block 1140 for performing one or more operations based at least in part on one or more of the one or more identified changes in the geologic environment. The analysis block 1136 can include performing one or more actions of the method 630 of FIG. 6.

Figure 12:
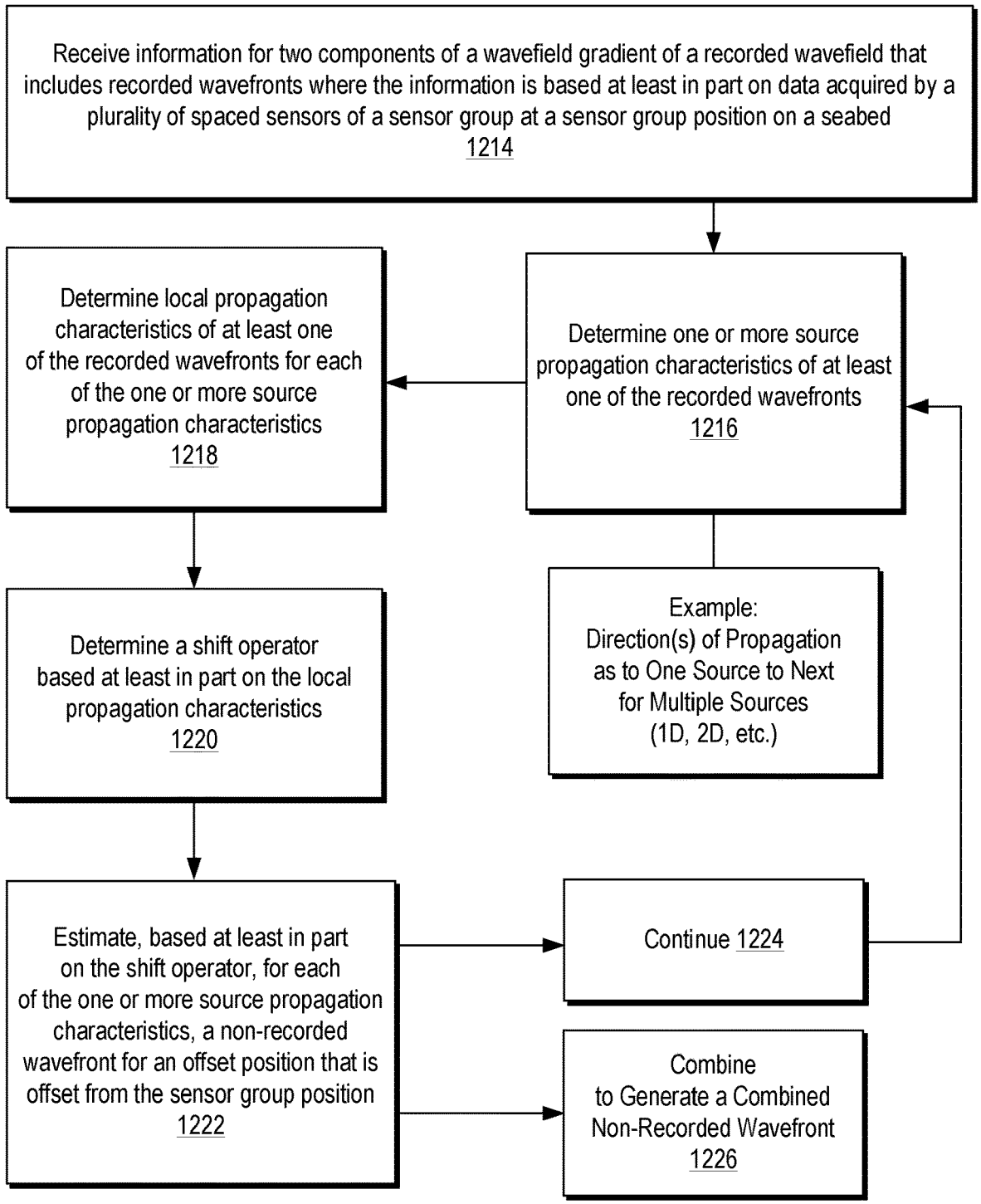
FIG. 12 illustrates a method.

FIG. 12 shows a method 1210 that includes a reception block 1210 for receiving information for two components of a wavefield gradient of a recorded wavefield that includes recorded wavefronts where the information is based at least in part on data acquired by a plurality of spaced sensors of a sensor group at a sensor group position on a seabed; a determination block 1216 for determining one or more source propagation characteristics of at least one of the recorded wavefronts (based on known or estimated locations of sources); a determination block 1218 for determining local propagation characteristics of at least one of the recorded wavefronts for each of the one or more source propagation characteristics; a determination block 1220 for determining a shift operator based at least in part on the local propagation characteristics; and an estimation block 1222 for estimating, based at least in part on the shift operator, for each of the one or more source propagation characteristics, a non-recorded wavefront for an offset position that is offset from the sensor group position. The method 1210 can continue per a continuation block 1224 and/or to a combination block 1226.

As to the combination block 1226, the method 1210 can include combining a plurality of non-recorded wavefronts where each of the non-recorded wavefronts corresponds to a determined source propagation characteristic. The method 1210 can include decomposing seismic source energy into individual components, processing the individual components to estimate corresponding portions of a non-recorded wavefront and then combining the portions to generate a combined, non-recorded wavefront for the seismic source energy (at an offset position, etc.).

Where a loop is implemented to process source characteristics individually, the method 1210 may loop back to the determination block 1216. Where a plurality of source propagation characteristics is determined, the method 1210 may proceed to handle the plurality of source propagation characteristics, optionally in parallel, as in parallel computing. The method 1210 may continue per the continuation block 1224 to one or more other actions such as to assess another sensor group, etc.

Blocks of the method 1210 may be provided as instructions such as the instructions 380 of the system 360 of FIG. 3. Such instructions may be in the form of one or more computer-readable media where the instructions include processor-executable instructions.

A method can include, where recorded wavefronts (as recorded by a sensor group) correspond to wavefronts generated by sources at source locations, decomposing the recorded wavefronts to determine at least one source propagation characteristic. A method can include a source characteristic by source characteristic approach to estimating a non-recorded wavefront, which can be for an offset position that is offset from a sensor group. In such an approach, the term non-recorded wavefront refers to the sensor group in that the sensor group is not at the offset position and thus does not record a wavefront or wavefronts at the offset position at which it is not located.

A source propagation characteristic can be a direction. One or more directions may be determined in a source-to-source manner for a plurality of sources, which may be arranged in one or more manners (1 D, 2D, etc.). A source propagation characteristic can be a source slowness component. A source propagation characteristic can be a direction of energy emitted from a source. Source slowness can refer to a plane wave, or another type of geometric wavefront such as a curved wavefront (hyperbolic, or parabolic).

A method can include, where recorded wavefronts correspond to wavefronts generated by sources at source locations, decomposing at least one of the recorded wavefronts for at least one of the source locations to determine at least one source propagation characteristic.

A method can include, where recorded wavefronts correspond to wavefronts generated by sources at source locations, decomposing the recorded wavefronts from a plurality of sources into at least one source propagation component.

A method can include pulling source side components as associated with an emitted source wavefield from one or more received/recorded wavefields (based on an estimated or a known location of source or estimated or known locations of sources).

A method can include decomposing waves to individual non-overlapping waves. Wavefronts from sources can be decomposed into individual source propagation components that can be processed individually.

For a sensor group on a seabed, a method can include separating different wavefronts being recorded by sensors of the sensor group in a manner that aims to achieve, as closely as possible, a result where no overlapping waves are arriving at the same time (no overlapping events). Such a method can benefit from decomposition of a wavefield from one or more sources to separate different wavefronts as may be characterized one or more source propagation characteristics. Such an approach can help to reduce effects of overlapping waves.

A method can include decomposing a wavefield for determining local propagation characteristics and can optionally include decomposing a wavefield for determining source propagation characteristics. In such an approach, concerns as to overlap of wavefronts arriving at approximately the same time can be reduced. In such an approach, a shift operator can be determined based on local propagation characteristic(s) and a loop may be implemented to process wavefronts decomposed as to source(s).

A method may be applied for a cabled system that acquires gradient information; consider a rope based approach that includes sensors operatively coupled to a rope that can be laid on a seabed.

A system can allow for placement of nodes (putting a node in the location an operator would like it to be given in accordance with a specification). As A system can provide for positioning (measuring the position of a node, wherever it may be within a specified distance from a target). A system can include one or more geophones (particle motion sensors measuring acceleration, velocity and/or displacement).

An assembly can include a battery; hydrophones operatively coupled to the battery where each of the hydrophones senses a pressure wavefield at an associated location; and a recorder operatively coupled to the hydrophones where the recorder stores sensed pressure wavefield data associated with each of the locations. In such an assembly, the pressure wavefield data, being from various different locations in the assembly, may be analyzed to determine gradient information (pressure gradient information). An assembly can include a housing where hydrophones are disposed within the housing at different locations. An assembly can include circuitry that determines gradient information based at least in part on pressure wavefield data and locations of sensors within the assembly. In such an assembly, the circuitry may be or include a processor (an ARM, RISC or other type of processor). An assembly may include transmission circuitry that wirelessly transmits gradient information from the assembly to a remote location. A node can include transmission circuitry and/or a pod can include transmission circuitry.

An assembly can include a plurality of batteries where each of the plurality of batteries is operatively coupled to a respective one of a plurality of hydrophones.

An assembly can include a base where a battery, hydrophones and a recorder are mounted to the base. An assembly can include a plurality of bases where each of the plurality of bases carries a respective one of a plurality of hydrophones.

An assembly can include at least one accelerometer. An assembly can include at least one geophone. An assembly can include a tilt meter. An assembly can include a compass. An assembly can include a gyroscope. An assembly can include one or more geophysical sensors that measure one or more geophysical phenomena such as one or more of gravity and magnetic field. An assembly can include one or more geophysical sensors that can determine an orientation of the assembly and/or one or more sensors in the assembly. An orientation of an assembly may be determined via time delays of information received by one or more sensors of the assembly; consider a beacon that emits energy from a location where sensors within the assembly (antennas, receivers, etc.) can receive at least a portion of the energy and where times of receipt may be utilized to determine, at least in part, orientation of the assembly (a node, a pod, etc.). Orientation information may be utilized to determine, at least in part, gradient information.

A method can include, for a site associated with a monitor survey phase of a 4D seismic survey, acquiring pressure wavefield information via an assembly of hydrophones at the site where the pressure wavefield information includes pressure wavefield gradient information; and, for a site associated with a baseline seismic survey of the 4D seismic survey, determining pressure wavefield information based at least in part on the acquired pressure wavefield information and the pressure wavefield gradient information. In such method, the assembly of hydrophones can be part of a node and/or part of a rope.

A method can include deploying an assembly of hydrophones at a site according to specifications of a 4D seismic survey where the specifications include a distance limit from a target location. In such a method, the distance limit can be a value such as a value of the order of tens of meters. A method can include retrieving an assembly of hydrophones (retrieving a node, a pod, etc.).

A method can include receiving information for two components of a wavefield gradient of a recorded wavefield that includes recorded wavefronts where the information is based at least in part on data acquired by a plurality of spaced sensors of a sensor group at a sensor group position on a seabed; determining local propagation characteristics of at least one of the recorded wavefronts; determining a shift operator based at least in part on the local propagation characteristics; and estimating, based at least in part on the shift operator, a non-recorded wavefront for an offset position that is offset from the sensor group position. In such a method, the spaced sensors can include spaced hydrophones. Spaced sensors can be of a spacing greater than approximately 10 centimeters and less than approximately 10 meters. Local propagation characteristics can be or include wavenumber components. Local propagation characteristics can be or include local propagation velocities.

A shift operator can depend on wavenumber components. Local propagation characteristics can include at least one horizontal slowness; consider local propagation characteristics that can include horizontal slowness along a first substantially horizontal direction and horizontal slowness along a second substantially horizontal direction (defined with respect to gravity).

Determining local propagation characteristics of at least one of recorded wavefronts can determine local propagation characteristics local to a sensor group position.

A method can include estimating values of a recorded wavefield at a plurality of offset positions based on receiving information for a plurality of group sensor positions. Recorded wavefronts can correspond to wavefronts generated by sources at source locations and a method can include decomposing at least one of the recorded wavefronts for at least one of the source locations to determine at least one source propagation characteristic. Such a method can include estimating a non-recorded wavefront based at least in part on at least one of the at least one source propagation characteristic. In such a method, the at least one source propagation characteristic can be a source slowness component.

A method can include determining both source propagation characteristics and local propagation characteristics of recorded wavefronts of a sensor group. Such an approach may be utilized to estimate a wavefront at a position offset from the sensor group.

A system can include a processor; memory operatively coupled to the processor; and processor-executable instructions stored in the memory to instruct the system to: receive information for two components of a wavefield gradient of a recorded wavefield that includes recorded wavefronts where the information is based at least in part on data acquired by a plurality of spaced sensors of a sensor group at a sensor group position on a seabed; determine local propagation characteristics of at least one of the recorded wavefronts; determine a shift operator based at least in part on the local propagation characteristics; and estimate, based at least in part on the shift operator, a non-recorded wavefront for an offset position that is offset from the sensor group position. In such a system, the shift operator can depend on wavenumber components.

An assembly can include a battery; hydrophones operatively coupled to the battery where each of the hydrophones senses a pressure wavefield at an associated location; and a recorder operatively coupled to the hydrophones where the recorder stores sensed pressure wavefield data associated with each of the locations. In such an assembly, the assembly can include a housing where the hydrophones are disposed within the housing. An assembly can include circuitry that determines local propagation characteristics of at least one of the recorded wavefronts based at least in part on the pressure wavefield data and the locations and/or source propagation characteristics, which may be based at least in part on estimated or known source locations, which may be transmitted to and received by the assembly. An assembly can include circuitry that determines a shift operator based at least in part on local propagation characteristics.

An assembly can include a base where a battery, hydrophones and a recorder are mounted to the base. An assembly can include a plurality of bases where each of the plurality of bases carries a respective hydrophone.

A method can include receiving information for two components of a wavefield gradient of a recorded wavefield, from a plurality of seismic sources, that includes recorded wavefronts where the information is based at least in part on data acquired by a plurality of spaced sensors of a sensor group at a sensor group position on a seabed; decomposing the source wavefield from the plurality of seismic sources, based on propagation characteristics, into components of a seismic source wavefield; determining propagation characteristics of at least one of the recorded wavefronts, for at least one of the components of the seismic source wavefield; determining a shift operator based at least in part on the propagation characteristics; estimating, based at least in part on the shift operator, a non-recorded wavefront for an offset position that is offset from the sensor group position; and recombining the non-recorded wavefronts for each component of the seismic source wavefield to generated a combined, non-recorded wavefront. Such an approach may aim to reduce effects of overlapping wavefronts at a sensor group as to estimation of a non-recorded wavefront (a combined, non-recorded wavefront) at an offset position.

A method can include receiving desired locations of nodes for deployment on a seabed of a seismic survey where each of the nodes includes a sealed housing and, within the sealed housing, at least one battery and spaced seismic sensors electrically powered by the at least one battery; determining locations of the nodes as deployed on the seabed where at least some of the determined locations differ from their corresponding desired locations; acquiring seismic data sensed by the spaced seismic sensors of the nodes where the acquired seismic data corresponds to the determined locations; and, based at least in part on the acquired seismic data, a spacing of the spaced seismic sensors and the desired locations, generating seismic data for the desired locations. In such a method, the desired locations can be locations of nodes of a baseline seismic survey such that the generated seismic data for the desired locations can be for a monitor seismic survey that is compared to seismic data for the baseline seismic survey where such a comparison can determine changes in an environment with respect to time.

A method can include generating seismic data for desired locations by determining a local node gradient for each of a plurality of nodes based at least in part on a distance between two sensors of spaced seismic sensors in each of the plurality of nodes.

A method can include comparing generated seismic data for desired location to seismic data from a prior seismic survey, which may be a baseline survey or a prior monitor survey.

A method can include determining locations of nodes, as deployed on a seabed, by acoustic pinging. Such a method includes deploying the nodes on the seabed prior to determining locations of the nodes.

A method can include performing a seismic survey prior to generating seismic data for desired locations where nodes are not actually located on the seabed.

Spaced seismic sensors in a node can be or include spaced hydrophones. Spacing of spaced seismic sensors can be greater than approximately 10 centimeters and less than approximately 1 meter. A housing of a node can be of a greater dimension than a spacing dimension of spaced seismic sensors. A node can be a disc-shaped node with a diameter that is about 1 meter or less where spacing of spaced seismic sensors is less than that diameter.

A method can include acquiring seismic data as sensed by spaced seismic sensors in nodes by communicating the seismic data from each of the nodes to a computing device where each of the nodes is disposed in a slot of a rack of a vessel.

A method can include utilizing nodes where each node includes electrical contacts accessible via an exterior of a sealed housing of each of the nodes where the electrical contacts are operatively coupled to at least one of at least one battery in each of the nodes.

A method can include utilizing nodes that can be deployed on a seabed as tethered to a cable.

A method can include generating seismic data for desired locations by determining a shift operator for each of a plurality of nodes based at least in part on local propagation characteristics of seismic energy at each of the node.

A system can include a processor; memory operatively coupled to the processor; and processor-executable instructions stored in the memory to instruct the system to: receive desired locations of nodes for deployment on a seabed of a seismic survey where each of the nodes includes a sealed housing and, within the sealed housing, at least one battery and spaced seismic sensors electrically powered by the at least one battery; determine locations of the nodes as deployed on the seabed where at least some of the determined locations differ from their corresponding desired locations; acquire seismic data sensed by the spaced seismic sensors of the nodes where the acquired seismic data corresponds to the determined locations; and, based at least in part on the acquired seismic data, a spacing of the spaced seismic sensors and the desired locations, generate seismic data for the desired locations. In such a system, the desired locations can be locations of nodes of a baseline seismic survey.

A system can include processor-executable instructions to generate seismic data in a manner that determines a local node gradient for each of a plurality of nodes based at least in part on a distance between two sensors of spaced seismic sensors in each of the nodes. In such an approach, each node can have a corresponding local node gradient that can be used to generate seismic data for a location that differs from the location of the node where that location can be a desired location as associated with a node of a prior seismic survey. A system can include processor-executable instructions to compare generated seismic data to seismic data from a prior seismic survey.

A seismic survey node can include a sealed housing; at least one rechargeable battery disposed within the sealed housing; spaced seismic sensors operatively coupled to the at least one rechargeable battery and disposed within the sealed housing where the spaced seismic sensors have a spacing therebetween of at least 10 centimeters; and a recorder operatively coupled to the spaced seismic sensors where the recorder stores sensed seismic data. Such a seismic survey node can include acoustic pinger circuitry operatively coupled to the at least one battery. A seismic survey node can include circuitry that determines local propagation characteristics of seismic energy based at least in part on seismic data sensed by the spaced seismic sensors.

A system may include one or more modules, which may be provided to analyze data, control a process, perform a task, perform a workstep, perform a workflow, etc.

Figure 13:
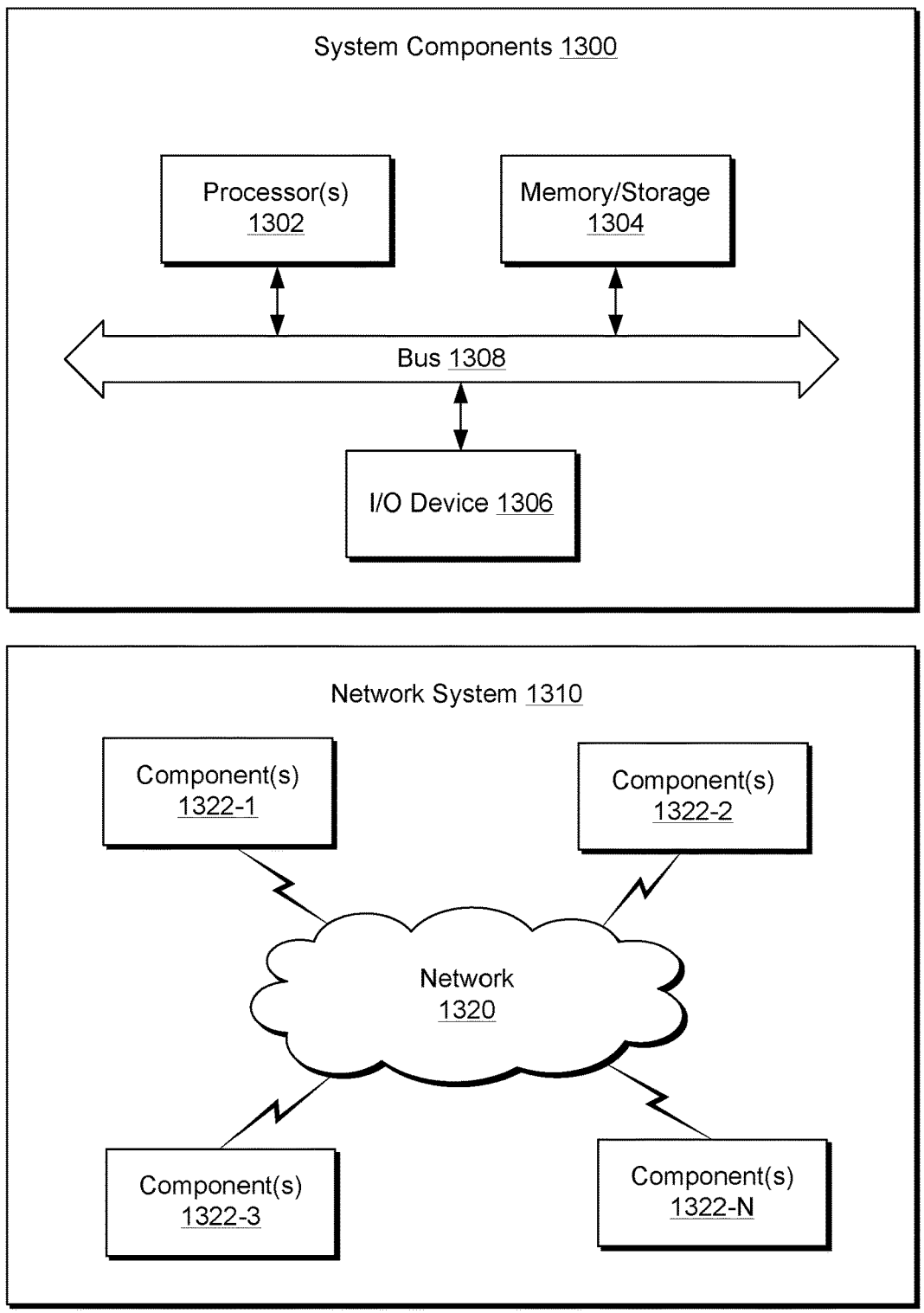
FIG. 13 illustrates components of a system and a networked system.

FIG. 13 shows components of a computing system 1300 and a networked system 1310. The system 1300 includes one or more processors 1302, memory and/or storage components 1304, one or more input and/or output devices 1306 and a bus 1308. Instructions may be stored in one or more computer-readable media (memory/storage components 1304). Such instructions may be read by one or more processors (see the processor(s) 1302) via a communication bus (see the bus 1308), which may be wired or wireless. The one or more processors may execute such instructions to implement (wholly or in part) one or more attributes (as part of a method). A user may view output from and interact with a process via an I/O device (see the device 1306). A computer-readable medium may be a storage component such as a physical memory storage device such as a chip, a chip on a package, a memory card, etc. (a computer-readable storage medium).

Components may be distributed, such as in the network system 1310. The network system 1310 includes components 1322-1, 1322-2, 1322-3, . . . 1322-N. The components 1322-1 may include the processor(s) 1302 while the component(s) 1322-3 may include memory accessible by the processor(s) 1302. Further, the component(s) 1322-2 may include an I/O device for display and optionally interaction with a method. The network may be or include the Internet, an intranet, a cellular network, a satellite network, etc.

A device may be a mobile device that includes one or more network interfaces for communication of information. A mobile device may include a wireless network interface (operable via IEEE 802.11, ETSI GSM, BLUETOOTH®, satellite, etc.). A mobile device may include components such as a main processor, memory, a display, display graphics circuitry (optionally including touch and gesture circuitry), a SIM slot, audio/video circuitry, motion processing circuitry (accelerometer, gyroscope), wireless LAN circuitry, smart card circuitry, transmitter circuitry, GPS circuitry, and a battery. A mobile device may be configured as a cell phone, a tablet, etc. A method may be implemented (wholly or in part) using a mobile device. A system may include one or more mobile devices.

A system may be a distributed environment such as a so-called "cloud" environment where various devices, components, etc. interact for purposes of data storage, communications, computing, etc. A device or a system may include one or more components for communication of information via one or more of the Internet (where communication occurs via one or more Internet protocols), a cellular network, a satellite network, etc. A method may be implemented in a distributed environment (wholly or in part as a cloud-based service).

Information may be input from a display (consider a touchscreen), output to a display or both. Information may be output to a projector, a laser device, a printer, etc. such that the information may be viewed. Information may be output stereographically or holographically. As to a printer, consider a 2D or a 3D printer. A 3D printer may include one or more substances that can be output to construct a 3D object. Data may be provided to a 3D printer to construct a 3D representation of a subterranean formation. Layers may be constructed in 3D (horizons, etc.), geobodies constructed in 3D, etc. Holes, fractures, etc., may be constructed in 3D (as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:
1. A method comprising:
  receiving desired locations of nodes for deployment on a seabed of a seismic survey wherein each of the nodes comprises a sealed housing and, within the sealed housing, at least one battery and spaced seismic sensors electrically powered by the at least one battery;

determining locations of the nodes as deployed on the seabed wherein at least some of the determined locations differ from their corresponding desired locations;

acquiring seismic data sensed by the spaced seismic sensors of the nodes wherein the acquired seismic data corresponds to the determined locations; and based at least in part on the acquired seismic data, a spacing of the spaced seismic sensors, the determined locations and the desired locations, generating seismic data for the desired locations, wherein the spacing of the spaced seismic sensors is used to determine a gradient of the acquired seismic data for each of the nodes, and wherein the acquired seismic data and the gradient are extrapolated to generate the seismic data for the desired locations.

2. The method of claim 1 wherein the desired locations comprise locations of nodes of a baseline seismic survey.

3. The method of claim 1 wherein the generating seismic data comprises determining a local node gradient for each of the nodes based at least in part on a distance between two sensors of the spaced seismic sensors.

4. The method of claim 1 comprising comparing the generated seismic data to seismic data from a prior seismic survey.

5. The method of claim 1 wherein the determining locations of the nodes comprises acoustic pinging using an acoustic pinger circuitry within the sealed housing operatively coupled to the at least one battery.

6. The method of claim 1 comprising deploying the nodes on the seabed prior to determining locations of the nodes.

7. The method of claim 1 comprising performing the seismic survey prior to generating the seismic data.

8. The method of claim 1 wherein each of the nodes comprises a recorder operatively coupled to the spaced seismic sensors, and the recorder is configured to store the seismic data sensed by the spaced seismic sensors of the nodes.

9. The method of claim 1 wherein the spacing of the spaced seismic sensors is greater than approximately 10 centimeters and less than approximately 1 meter.

10. The method of claim 1 wherein the acquiring comprises communicating the seismic data from each of the nodes to a computing device wherein each of the nodes is disposed in a slot of a rack of a vessel.

11. The method of claim 1 wherein each node comprises electrical contacts accessible via an exterior of the sealed housing wherein the electrical contacts are operatively coupled to at least one of the at least one battery.

12. The method of claim 1 wherein the nodes as deployed on the seabed are tethered to a cable.

13. The method of claim 1 wherein the generating seismic data comprises determining a shift operator for each of the nodes based at least in part on local propagation characteristics of seismic energy based at least in part on seismic data sensed by the spaced seismic sensors at each of the nodes and wherein the local propagation characteristics are determined by a circuitry within the sealed housing based at least in part on seismic data sensed by the spaced seismic sensors.

14. A system comprising:
a processor;
memory operatively coupled to the processor; and
processor-executable instructions stored in the memory to instruct the system to:
receive desired locations of nodes for deployment on a seabed of a seismic survey wherein each of the nodes comprises a sealed housing and, within the sealed housing, at least one battery and spaced seismic sensors electrically powered by the at least one battery;

determine locations of the nodes as deployed on the seabed wherein at least some of the determined locations differ from their corresponding desired locations;

acquire seismic data sensed by the spaced seismic sensors of the nodes wherein the acquired seismic data corresponds to the determined locations; and based at least in part on the acquired seismic data, a spacing of the spaced seismic sensors, the determined locations and the desired locations, generating seismic data for the desired locations, wherein the spacing of the spaced seismic sensors is used to determine a gradient of the acquired seismic data for each of the nodes, and wherein the acquired seismic data and the gradient are extrapolated to generate the seismic data for the desired locations.

15. The system of claim 14 wherein the desired locations comprise locations of nodes of a baseline seismic survey.

16. The system of claim 14 wherein the processor-executable instructions to generate seismic data comprise processor-executable instructions to determine a local node gradient for each of the nodes based at least in part on a distance between two sensors of the spaced seismic sensors.

17. The system of claim 14 comprising processor-executable instructions to compare the generated seismic data to seismic data from a prior seismic survey.

18. A seismic survey node comprising:
a sealed housing;
at least one rechargeable battery disposed within the sealed housing;
spaced seismic sensors operatively coupled to the at least one rechargeable battery and disposed within the sealed housing, wherein the spaced seismic sensors comprise a spacing therebetween of at least 10 centimeters;
a processor, wherein the processor is configured to receive data indicating the spacing of the spaced seismic sensors is transmitted to a, wherein the processor is configured to determine a location of the seismic survey node as deployed on a seabed with respect to a desired location for deployment on the seabed and acquire seismic data sensed by the spaced seismic sensors of the seismic survey node, wherein the acquired seismic data corresponds to the determined location, wherein the processor is configured to determine a gradient of the acquired seismic data based on the spacing of the spaced seismic sensors, wherein the processor is configured to extrapolate the acquired seismic data and the gradient to generate the seismic data for the desired location; and
a recorder operatively coupled to the spaced seismic sensors, wherein the recorder stores sensed seismic data.

19. The seismic survey node of claim 18 comprising acoustic pinger circuitry operatively coupled to the at least one battery.

20. The seismic survey node of claim 18 comprising circuitry that determines local propagation characteristics of seismic energy based at least in part on seismic data sensed by the spaced seismic sensors.

* * * * *